United States Patent
Son et al.

(10) Patent No.: US 12,512,550 B2
(45) Date of Patent: Dec. 30, 2025

(54) BATTERY ENCLOSURE AND ENERGY STORAGE SYSTEM INCLUDING THE SAME

(71) Applicant: LG ENERGY SOLUTION, LTD., Seoul (KR)

(72) Inventors: Kown Son, Daejeon (KR); Goansu Jung, Daejeon (KR); Myoungsic Kim, Daejeon (KR); Heechan Kim, Daejeon (KR); Seungjun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/964,190

(22) Filed: Nov. 29, 2024

(65) Prior Publication Data

US 2025/0183452 A1   Jun. 5, 2025

(30) Foreign Application Priority Data

Dec. 1, 2023 (KR) .................. 10-2023-0172422
Nov. 14, 2024 (KR) .................. 10-2024-0161894

(51) Int. Cl.

| | |
|---|---|
| *H01M 50/262* | (2021.01) |
| *H01M 10/613* | (2014.01) |
| *H01M 10/663* | (2014.01) |
| *H01M 50/251* | (2021.01) |
| *H01M 50/298* | (2021.01) |

(52) U.S. Cl.
CPC ........ *H01M 50/251* (2021.01); *H01M 10/613* (2015.04); *H01M 10/663* (2015.04); *H01M 50/262* (2021.01); *H01M 50/298* (2021.01); *H01M 2220/10* (2013.01)

(58) Field of Classification Search
CPC ............. H01M 50/251; H01M 10/613; H01M 10/663; H01M 50/262; H01M 50/298; H01M 2220/10
See application file for complete search history.

(56) References Cited

U.S. PATENT DOCUMENTS

| | | | | |
|---|---|---|---|---|
| 2010/0165565 A1* | 7/2010 | Hellriegal | ............ | H05K 7/2079 |
| | | | | 361/679.02 |
| 2012/0263989 A1* | 10/2012 | Byun | .................. | H01M 50/271 |
| | | | | 361/752 |
| 2018/0339636 A1 | 11/2018 | Lee et al. | | |
| 2023/0335854 A1 | 10/2023 | Kim et al. | | |
| 2023/0354546 A1* | 11/2023 | Altman | .................... | H05K 7/18 |
| 2024/0258655 A1 | 8/2024 | Yang et al. | | |
| 2024/0347791 A1 | 10/2024 | Yang et al. | | |

FOREIGN PATENT DOCUMENTS

| | | |
|---|---|---|
| KR | 10-2012-0117413 A | 10/2012 |
| KR | 10-1706717 B1 | 3/2017 |
| KR | 10-2017-0082817 A | 7/2017 |
| KR | 10-2022-0051679 A | 4/2022 |
| KR | 10-2416817 B1 | 7/2022 |
| KR | 10-2023-0112086 A | 7/2023 |
| KR | 10-2023-0112088 A | 7/2023 |
| KR | 10-2023-0130210 A | 9/2023 |
| KR | 10-2023-0156488 A | 11/2023 |

* cited by examiner

*Primary Examiner* — Muhammad S Siddiquee
(74) *Attorney, Agent, or Firm* — Birch, Stewart, Kolasch & Birch, LLP

(57) ABSTRACT

A battery enclosure according to an embodiment of the present disclosure includes an enclosure including a base fixed to an installation surface, and a battery rack that accommodates at least one battery and is fixed to the base. The battery rack includes at least one vertically extending column, the base includes at least one horizontal beam and at least one vertical beam. The horizontal beam includes a fixture that fixes the battery enclosure to the installation surface, and the fixture is provided at a position corresponding to a position of the column included in the battery rack.

20 Claims, 22 Drawing Sheets

BATTERY ENCLOSURE AND ENERGY STORAGE SYSTEM INCLUDING THE SAME

CROSS-REFERENCE TO RELATED APPLICATIONS

This application is based on and claims priority from Korean Patent Application No. 10-2023-0172422, filed on Dec. 1, 2023, and Korean Patent Application No. 10-2024-0161894, filed on Nov. 14, 2024, with the Korean Intellectual Property Office, the disclosure of each application is incorporated herein in its entirety by reference.

TECHNICAL FIELD

The present disclosure relates to a battery enclosure and an energy storage system including the same.

BACKGROUND

As the energy issues such as power shortages and eco-friendly energy have become more prominent recently, energy storage systems (ESSs) for storing generated power have been receiving many attention. By using the ESSs, it becomes easier to establish power management systems such as smart grid systems, and, as a result, it becomes possible to readily control the power supply and demand in specific regions or cities. In addition, as the commercialization of electric vehicles gains momentum, the ESSs are also applicable to the electric charging stations for charging electric vehicles.

The ESSs may be configured in various forms, but are typically configured to include one or more enclosure. Inside the enclosures, multiple battery modules or battery packs (hereinafter referred to as "batteries") are disposed, and the batteries may be connected with each other in series and/or in parallel. For example, Korean Patent Laid-Open Publication No. 10-2023-0112086 discloses an ESS that includes two or more enclosures.

SUMMARY

The present disclosure provides a battery enclosure having a compact structure by achieving optimization of the internal space, and an energy storage system including the same.

The present disclosure also provides a battery enclosure that is simple to install while ensuring earthquake-resistant performance, and an energy storage system including the same.

However, the scope of the present disclosure is not limited to the aforementioned descriptions and may be expanded in various forms within the technical ideas included in the present disclosure.

A battery enclosure according to an embodiment of the present disclosure includes: an enclosure including a base that is fixed to an installation surface; and a battery rack fixed to the base and configured to accommodate at least one battery. The battery rack includes at least one column extending in a vertical direction, the base includes at least one horizontal beam and at least one vertical beam, the horizontal beam includes a fixture provided at a position corresponding to a position of the column included in the battery rack and configured to fix the battery enclosure to the installation surface.

A single fixture may be provided on the horizontal beam.

The fixture provided on the horizontal beam may be positioned apart from a center of the horizontal beam in a length direction.

The fixture may further include a middle fixture provided on the horizontal beam and a corner fixture positioned adjacent to an end of the horizontal beam or an end of the vertical beam.

Multiple corner fixtures may be provided, and the middle fixture may be positioned between two corner fixtures.

The middle fixture may be positioned closer to one of the two corner fixtures than to another one.

The battery rack may include multiple columns in which batteries are vertically stacked.

The middle fixture may include a bottom surface in which a hole is formed, and a support surface extending from an edge of the bottom surface to the horizontal beam.

The corner fixture may include a bottom surface in which a hole is formed, and an edge of the bottom surface is positioned adjacent to the horizontal beam or the vertical beam.

The base may include a rack fixing beam positioned between two horizontal beams, and the column may be fixed to the rack fixing beam.

A sub-vertical beam may be positioned below the rack fixing beam, and the sub-vertical beam may be disposed perpendicular to the horizontal beam.

The horizontal beam may include a partition formed therein.

The base may further include a sub-vertical beam disposed perpendicular to the horizontal beam, and both ends of the sub-vertical beam may be in contact with the partition of the horizontal beam.

The battery enclosure may further include a control panel configured to manage the battery rack, and the front surface of the control panel may be disposed perpendicular to the front surface of the battery rack.

The battery enclosure may further include an air conditioner configured to dissipate heat from the at least one battery, and the air conditioner may be provided in a state coupled to a door installed on the front surface of the battery rack to allow access to the battery rack.

A cable may be installed in the battery enclosure as a conductive member for electrical connection.

An energy storage system according to other embodiment of the present disclosure may include at least one of the above-described battery enclosure.

According to the embodiments, by changing the layout of internal components, dead space may be minimized, thereby improving the space efficiency of the battery enclosure and the energy storage system including the same.

Furthermore, according to the embodiments, by changing a power distribution structure that supplies power to the battery enclosure and minimizing the number of anchors used to fix the battery enclosure to an installation site, the ease of installation may be improved, and the installation work may be simplified and streamlined.

The effects of the present disclosure are not limited to those mentioned above, and other effects not mentioned above will be clearly understood by a person ordinarily skilled in the art from the description of the claims.

BRIEF DESCRIPTION OF THE DRAWINGS

The drawings attached herewith are merely illustrative of embodiments of the present disclosure, and take on the role of further facilitating the understanding of the technical idea of the present disclosure along with the descriptions herein.

Thus, the present disclosure should not be construed as being limited to those illustrated in the drawings.

DETAILED DESCRIPTION

Figure 1:
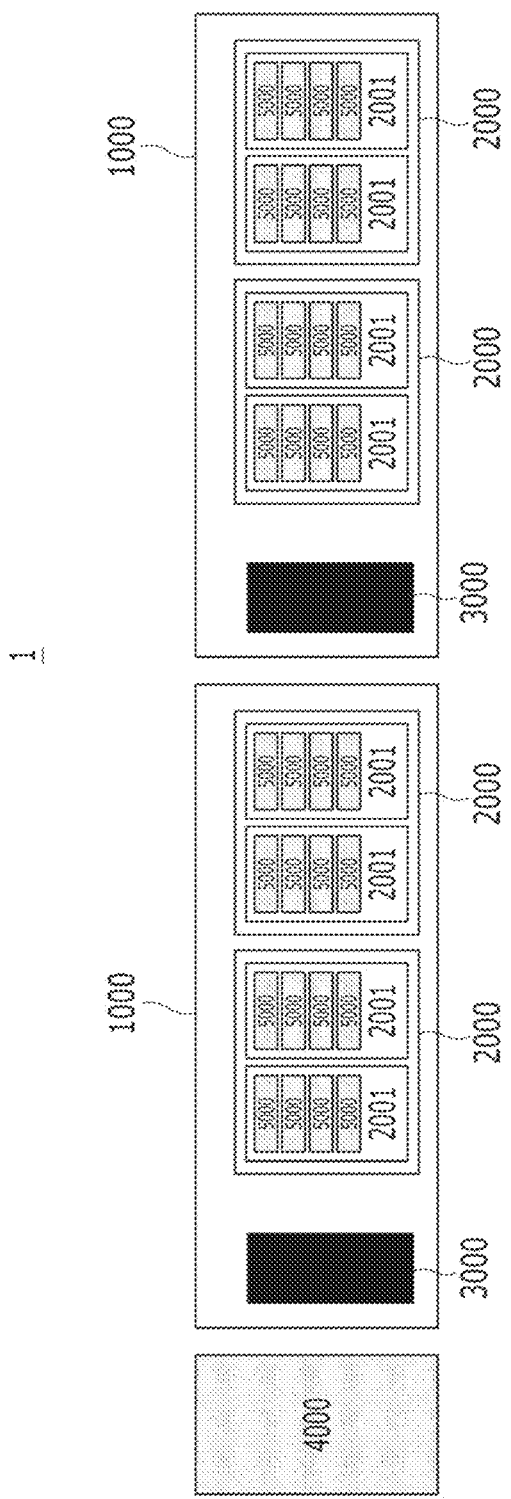
FIG. 1 is a schematic block diagram of an energy storage system (ESS) according to an embodiment of the present disclosure.

Hereinafter, various embodiments of the present disclosure will be described in detail with reference to the accompanying drawings so that a person ordinarily skilled in the art can easily implement the present disclosure. The present disclosure may be implemented in various other forms besides those described below, and the scope of the present disclosure is not limited by the embodiments described herein.

In order to clearly explain the present disclosure, parts irrelevant to the description are omitted, and the same reference numerals are used for the same or similar components throughout the specification.

In addition, the sizes and thicknesses of the components illustrated in the drawings are arbitrarily enlarged or reduced for the sake of convenience in explanation, and it is obvious that the present disclosure is not limited to what is illustrated. In the following drawings, the thickness of each layer is enlarged to clearly represent the various layers and regions. Furthermore, in the following drawings, the thicknesses of some layers and regions have been exaggerated for the sake of convenience in explanation.

In addition, when a part such as a layer, a film, a region, or a plate is described as being "above" or "on" another part, this should be interpreted to include not only cases where a part such as a layer, a film, region, or a plate is "directly above" another part, but also cases there are other parts therebetween. Conversely, when a part such as a layer, a film, a region, or a plate is described as being "directly above" another part, it may mean that there are no other parts therebetween. Furthermore, when a part is described as being "on" or "above" a reference part, this means that the part is positioned above or below the reference part, and does not necessarily mean that the part is positioned "above" or "on" the reference part in a direction opposite to gravity. Similarly, just as a part is described as being "above" or "on" another part, describing a part as being "below" or "under" another part may be understood with reference to the foregoing.

Throughout the specification, when a part is described as "including" a certain component, it means that the part may further include other components, unless specifically stated otherwise, rather than excluding them.

Throughout the specification, the term "in plan view" refers to the view of the part when viewed from above, while the term "in cross-sectional view" refers to the view of the part when viewed from the side after a vertical cut.

A battery pack positioned inside the enclosure of an energy storage system (ESS) is mounted on, for example, a rack frame. Thus, when the enclosure or the rack frame moves due to external impact or vibration, there is a problem in that the battery pack may be detached from the rack frame or the battery pack may be damaged. Therefore, the enclosure has been required to be stably fixed to the installation site, which may result in an increase in the number of anchors that fix the enclosure to the ground. However, when the number of anchors is unnecessarily increased to stably fix the enclosure to the ground, there is a problem in that the complexity of the installation work and the installation time increase. The term "enclosure" used throughout the specification, may also include a box or a container.

An ESS may include two or more enclosures, and these enclosures may be electrically connected to each other to receive power. However, a power distribution structure connecting the two enclosures should be formed after the enclosures are fixedly installed, which makes it difficult for an ESS provider (vendor) to control installation errors.

In addition, standard enclosures of 20 feet or 40 feet are typically used in the ESS, but since the sizes of batteries and rack frames from various manufacturers vary, there has been a problem in that these structures could not be efficiently accommodated within the standard enclosures.

Hereinafter, an ESS according to an embodiment of the present disclosure is described.

FIG. 1 is a schematic block diagram of an ESS according to an embodiment of the present disclosure.

Referring to FIG. 1, the ESS 1 according to an embodiment may include a battery enclosure 1000, a battery rack 2000 that includes multiple batteries 5000, a control panel 3000 for managing the electrical devices inside the battery enclosure 1000, and a control cabinet 4000 for managing the state of the battery enclosure 1000 and overseeing the operation of the ESS 1. The ESS 1, according to the embodiment, includes two battery enclosures 1000 each includes two battery racks 2000. Each battery rack 2000 includes two sub-racks 2001, and each sub-rack 2001 includes four batteries 5000. However, the ESS 1 is not limited to these numbers, and the number of battery enclosures 1000, battery racks 2000, sub-racks 2001, and batteries 5000, may be arbitrarily adjusted as needed.

The control cabinet 4000 may oversee the overall operation of the ESS 1. Through the control cabinet 4000, the ESS 1 may be connected to external devices. For example, the control cabinet 4000 may be connected to an external power conversion system (PCS). By connecting the control cabinet 4000 with the PCS, the ESS 1 may receive charging power from the PCS and deliver discharging power to the PCS. Here, the PCS may also be described as being included within the ESS 1.

The control cabinet 4000 may be electrically connected to at least one battery enclosure 1000. The battery enclosure 1000 may receive charging power from the control cabinet 4000 and deliver discharging power to the control cabinet 4000.

The control cabinet 4000 may include a control unit (not illustrated) for controlling the operation of the ESS 1. The control unit may process information received from, for example, a battery management system (BMS) (not illustrated) of the battery enclosure 1000 and may instruct the battery enclosure 1000 to perform operations based on this information. The control unit may transmit and receive electrical signals to and from, for example, the BMS located outside the control cabinet 4000 through a communication unit provided in the control cabinet 4000. Here, the BMS may include a rack BMS electrically connected to multiple batteries 5000 included in the battery rack 2000, and/or a battery BMS provided for each individual battery 5000. As will be described later, the rack BMS may be connected to a control unit 5100 (see, e.g., FIG. 20) included in the battery rack 2000.

The control cabinet 4000 may be a component physically separated from the battery enclosure 1000. In this case, the control cabinet 4000 may include, for example, a separate housing in the form of an enclosure, and the aforementioned control unit may be positioned inside the separate housing, such as an enclosure, to be protected from external environmental factors.

The battery enclosure 1000 may include multiple battery racks 2000. Each battery rack 2000 may include multiple (e.g., two in the present embodiment) sub-racks 2001, and multiple (e.g., four in the present embodiment) batteries 5000 may be stacked vertically in each sub-rack 2001. Here, the batteries 5000 positioned in each sub-rack 2001 may be described as forming a column. For example, when the battery rack 2000 includes three sub-racks 2001, the battery rack 2000 may be described as including batteries 5000 arranged in three columns.

The battery enclosure 1000 may include a control panel 3000 for managing the electrical devices therein. The control panel 3000 may be electrically connected to each battery rack 2000 inside the battery box 1000. The control panel 3000 may also be electrically connected to each sub-rack 2001 included in the battery rack 2000. In addition, the control panel 3000 may be electrically connected to the control cabinet 4000 positioned outside the battery enclosure 1000. The power delivered from the control cabinet 4000 to the battery enclosure 1000 may be delivered to the battery rack 2000 through the control panel 3000.

The control panel 3000 may be involved in the charging, discharging, and other operations of the battery rack 2000. Here, the term "involved" may be used to include not only the operation of the battery rack 2000 being controlled based on the decisions of the control panel 3000, but also the control panel 3000 receiving a request from the control cabinet 4000 and controlling the operation of the battery rack 2000 based on the request.

In addition, the term "involved" may be broadly interpreted, and may also include cases where the information processing of the control panel 3000 is not involved in controlling the operation of the battery rack 2000. For example, in some embodiments, the control panel 3000 may be simply consolidate cables or busbars extending from multiple battery racks 2000 into one. In such cases, even though electrical signals transmitted between the control cabinet 4000 and the battery rack 2000 may pass through the control panel 3000, the control panel 3000 may not involve any information processing other than transmitting the signals during the transmission process. As such, the electrical signals of the control cabinet 4000 are transmitted to the battery rack 2000 via the control panel 3000 without involving a separate information processing process of the control panel 3000, which, in this specification, may also be explained as the control panel 3000 being involved in the operation of the battery rack 2000.

Hereinafter, the battery enclosure 1000 according to an embodiment of the present disclosure is described.

Figure 2:
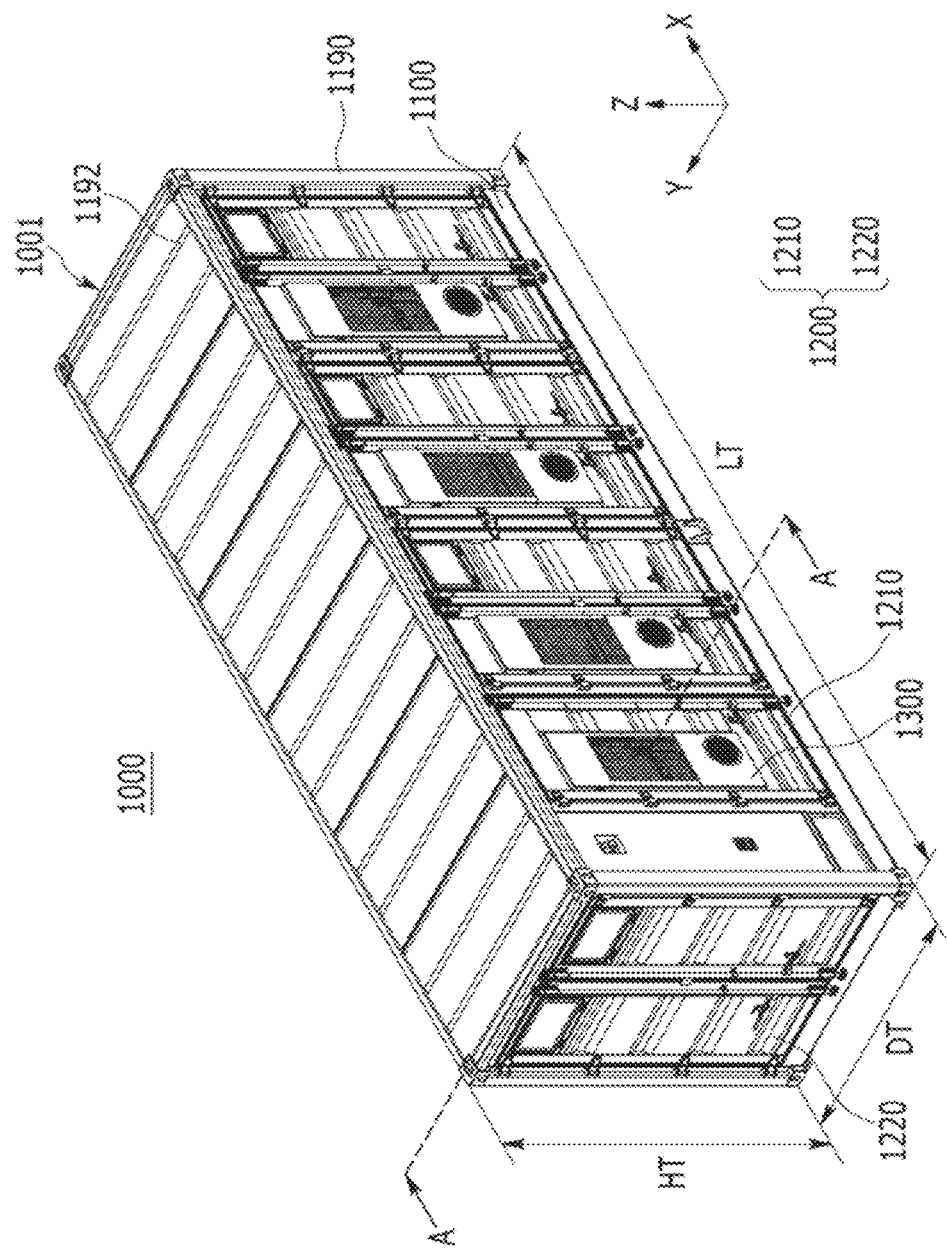
FIG. 2 is a perspective view of a battery enclosure according to an embodiment of the present disclosure.
Figure 3:
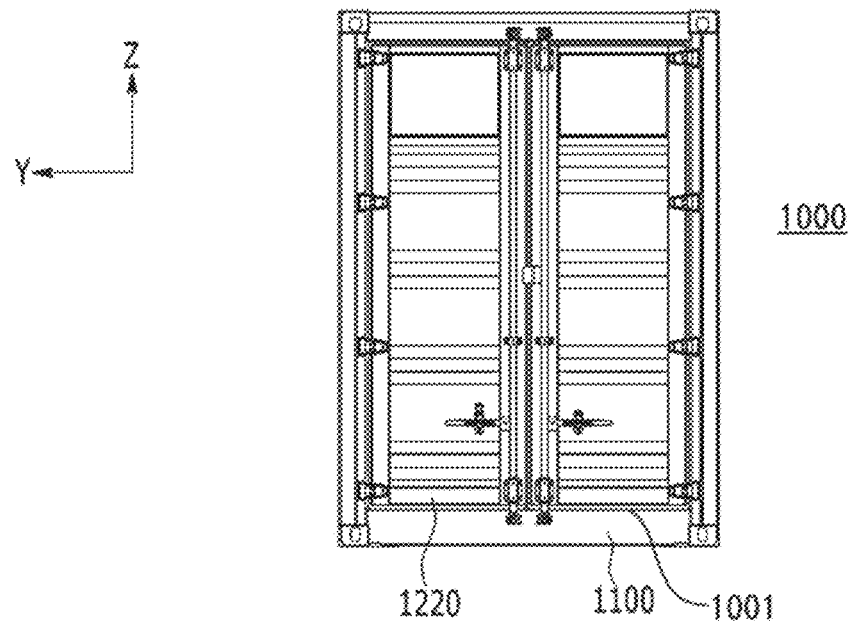
FIG. 3 is a side view of the battery enclosure according to an embodiment of the present disclosure.
Figure 4:
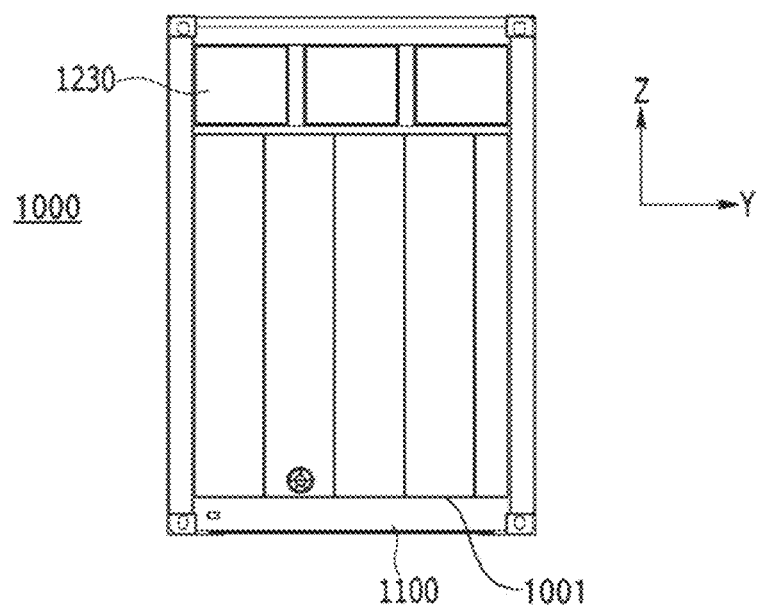
FIG. 4 is another side view of the battery enclosure according to an embodiment of the present disclosure.
Figure 5:
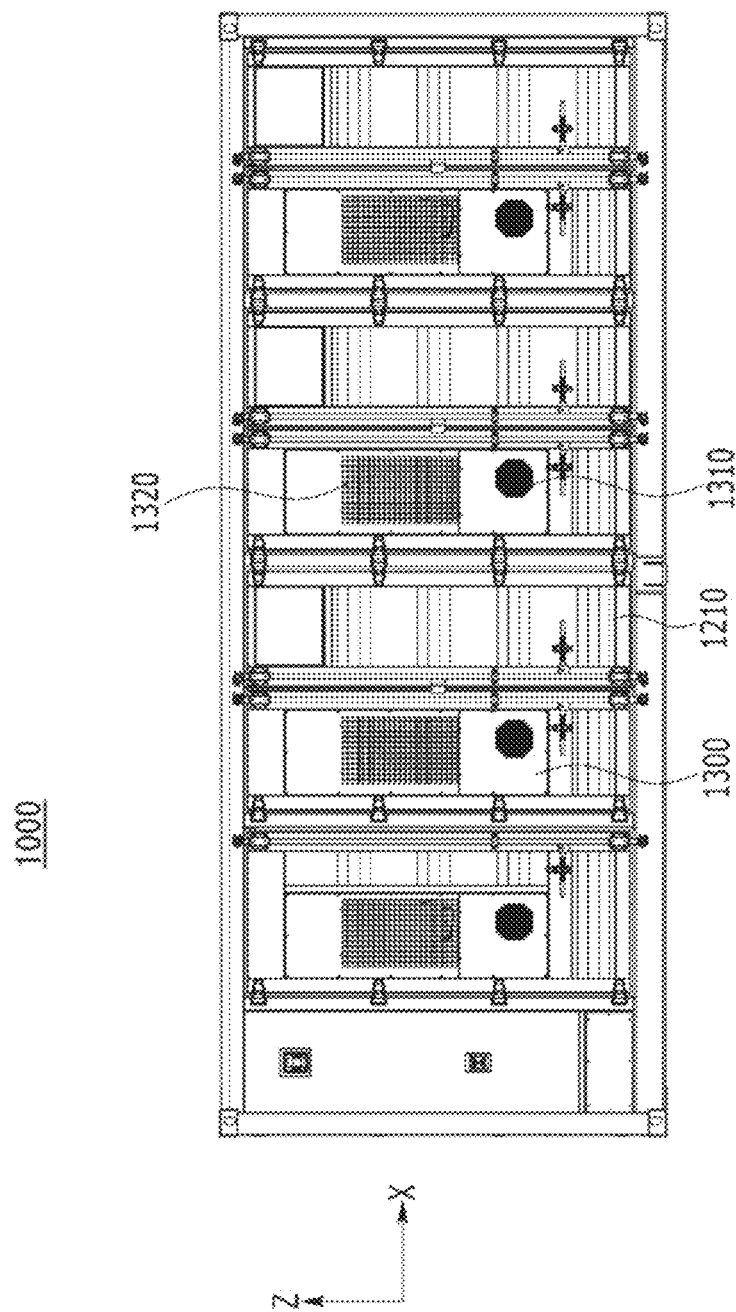
FIG. 5 is a front view of the battery enclosure according to an embodiment of the present disclosure.
Figure 6:
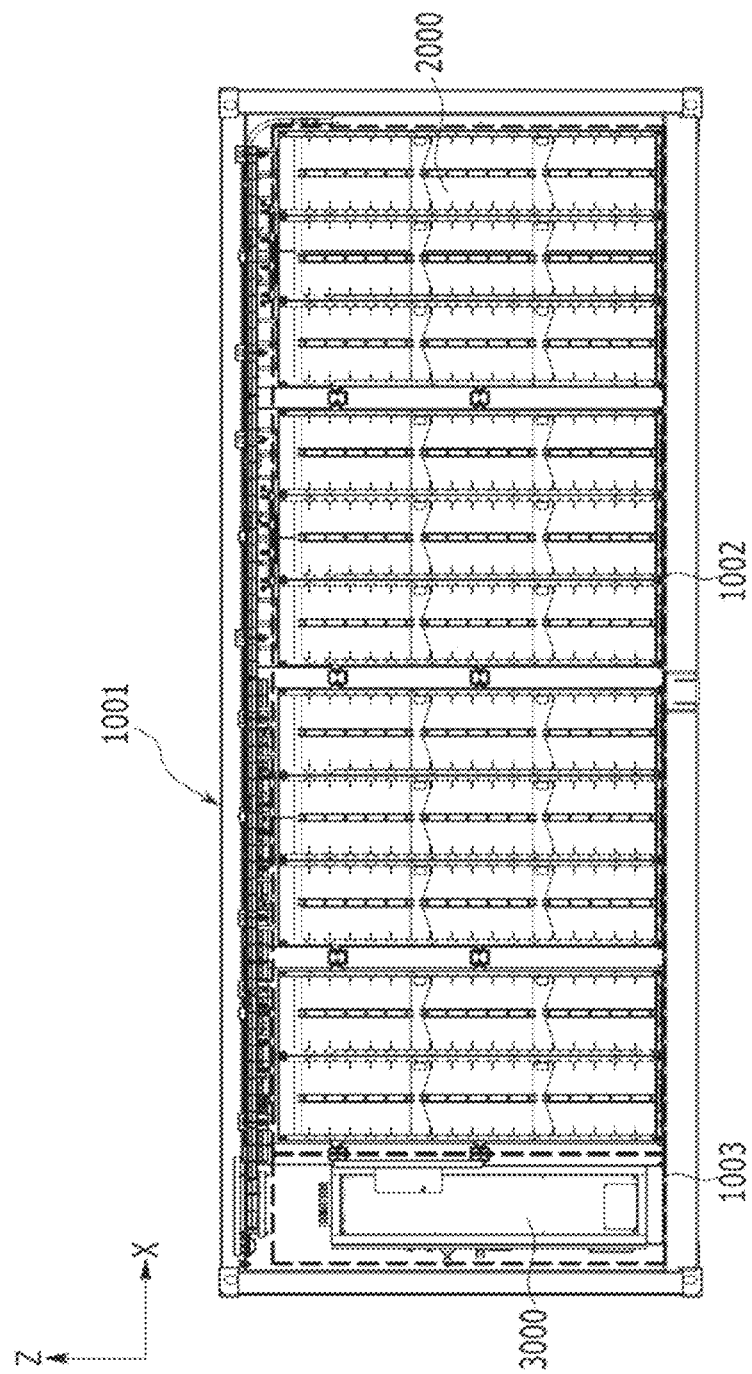
FIG. 6 is a front view of the battery enclosure of FIG. 2 in the state where some components are omitted.
Figure 7:
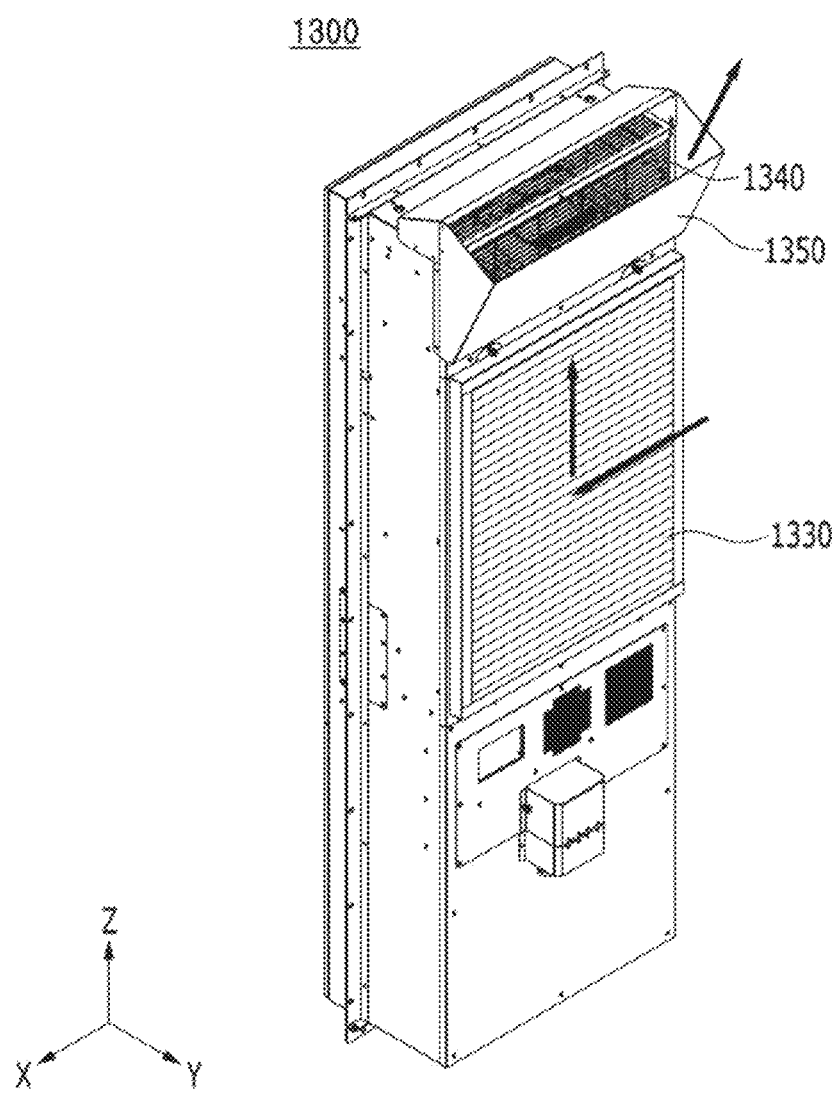
FIG. 7 is a perspective view of an air conditioner included in the battery enclosure of FIG. 2.
Figure 8:
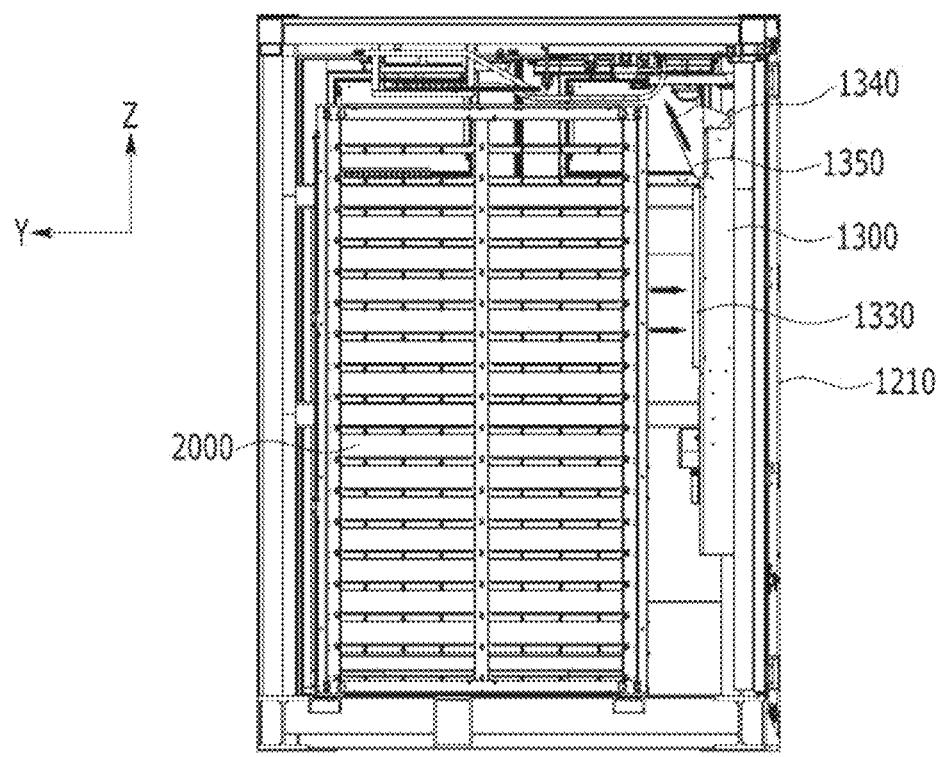
FIG. 8 is a cross-sectional view taken along line A-A of FIG. 2.

FIG. 2 is a perspective view of the battery enclosure 1000 according to an embodiment of the present disclosure. FIG. 3 is a side view of the battery enclosure 1000 according to an embodiment of the present disclosure. FIG. 4 is another side view of the battery enclosure 1000 according to an embodiment of the present disclosure. FIG. 5 is a front view of the battery enclosure 1000 according to an embodiment of the present disclosure. FIG. 6 is a front view of the battery enclosure 1000 of FIG. 2 in the state where some components are omitted. FIG. 7 is a perspective view of an air conditioner included in the battery enclosure 1000 of FIG. 2. FIG. 8 is a cross-sectional view taken along line A-A of FIG. 2.

Referring to FIGS. 2 to 8, the battery enclosure 1000 of the present embodiment may include an enclosure 1001 with an internal accommodating space, and a battery rack 2000 positioned in the accommodating space defined by the enclosure 1001 for mounting batteries 5000.

The batteries 5000 refer to energy storage units provided in the battery rack 2000, which may be battery modules or battery packs. According to an embodiment, the batteries 5000 may be positioned in the battery rack 2000 positioned in the accommodating space inside the enclosure 1001.

The enclosure 1001 may have a rectangular parallelepiped shape, including a bottom surface, a top surface, and side surfaces extending between the bottom and top surfaces. The side surfaces of the enclosure 1001 may be classified into the front, rear, left, and right surfaces. The enclosure 1001 may be described as having a length, a depth, and a height.

The length LT of the enclosure 1001 may correspond to the size along the X-axis. The depth DT of the enclosure 1001 may correspond to the size along the Y-axis. The height HT of the enclosure 1001 may correspond to the size along the Z-axis. Here, the length, depth, and height of the battery rack 2000 may also be described as the sizes along the X-axis, Y-axis, and Z-axis, respectively, like the enclosure 1001.

The both sides of the enclosure 1001 in the length direction (e.g., X-axis direction) may be referred to as the left side (−X-axis direction) and the right side (e.g., +X-axis direction), respectively. The both sides along the depth direction of the enclosure 1001 may be referred to as the front side (e.g., −Y-axis direction) and the rear side (e.g., +Y-axis direction), respectively. The both sides along the height direction of the enclosure 1001 may be referred to as the top side (e.g., +Z-axis direction) and the bottom side (e.g., −Z-axis direction), respectively. The left/right, front/rear, and top/bottom of the battery rack 2000 may also be described in the same manner.

The enclosure 1001 may include a base 1100 forming the bottom, main columns 1190 standing vertically at the corners of the base 1100, and a roof 1192 connected perpendicularly to the main columns 1190 and forming the roof of the enclosure 1001.

Plate-like members may be positioned between the main columns 1190 of the enclosure 1001, and the edges of the plate-like members facing each other may be fixed to the main columns 1190 to form the side surfaces of the enclosure 1001. However, as will be described later, a portion of the side surfaces of the enclosure 1001 may be provided with a door 1200 or other members.

The enclosure 1001 may include a door 1200 for opening and closing the enclosure 1001. By opening the door 1200, at least one side of the enclosure 1001 may be opened to allow an operator to access the internal components of the enclosure 1001, thereby enabling maintenance of the battery enclosure 1000. In addition, when the door 1200 is closed, the interior of the enclosure 1001 may be sealed off from the external environment, thereby protecting, for example, the batteries 5000 and other components inside the enclosure from external conditions.

According to an embodiment, there may be multiple doors 1200. The door 1200 may include a first door 1210 and a second door 1220. The first door 1210 may be positioned on one surface of the enclosure 1001, and the second door 1220 may be positioned on another surface of the enclosure 1001.

A battery rack 2000 may be positioned at the rear side of the first door 1210 to allow an access to the battery rack 2000 by an operator. By having the first door 1210 on the enclosure 1001, when a failure or fire occurs in a battery 5000, the problem in the battery enclosure 1000 may be resolved by quickly removing or replacing the battery 5000 or the battery rack 2000.

According to an embodiment, there may be multiple first doors 1210. Each first door 1210 may be used for individually managing a battery rack 2000. Each first door 1210 may correspond to each battery rack 2000 positioned in the accommodating space. However, depending on the design, the number of first doors 1210 may be more or fewer than the number of battery racks 2000.

The control panel 3000 may be positioned on the rear side of the second door 1220 to allow an access to the control panel 3000 by an operator.

One surface of the enclosure 1001 where the first door 1210 is positioned and another surface of the enclosure 1001 where the second door 1220 is positioned, may be disposed to be perpendicular to each other, thereby allowing the first door 1210 and the second door 1220 to be positioned perpendicular to each other. For example, the first door 1210 may be positioned on the front surface of the enclosure 1001, and the second door 1220 may be positioned on one of the left or right surfaces of the enclosure 1001.

In the prior art, doors are respectively provided on the front and rear surfaces of the enclosure 1001 to facilitate the installation and management of the batteries 5000. However, since the enclosure 1001 is typically designed to have a relatively large length LT, when a door is provided on the rear surface, the door is positioned over a relatively large surface area, which makes the sealing and maintenance of the enclosure 1001 more difficult. When the door is provided on the rear surface, it becomes difficult for an operator to access the enclosure, and when two enclosures 1001 are disposed with their rear surfaces facing each other, efficient space utilization may be difficult because a spacing that allows access by an operator is required. However, in the enclosure 1001 of the present embodiment, the second door 1220 is provided on the left or right surface instead of the rear surface, thereby minimizing the aforementioned problems.

Referring to FIG. 6, the accommodating space inside the enclosure 1001 in present embodiment may include a power storage space 1002 and a control space 1003.

The power storage space 1002 and control space 1003 may be positioned side by side in the length direction (e.g., the X-axis direction) of the enclosure 1001. The power storage space 1002 may be positioned on one side of the enclosure 1001 in the length direction (e.g., the X-axis direction), and the control space 1003 may be located on the other side in the length direction (e.g., the X-axis direction) of the enclosure 1001. For example, the power storage space 1002 may be positioned on the right or left side of the enclosure 1001, and the control space 1003 may be positioned on the left or right side of the enclosure 1001.

While the power storage space 1002 and control space 1003 are described separately, this does not mean that the power storage space 1002 and control space 1003 are isolated from each other. Therefore, there may not be a partition or other structure added to isolate the power storage space 1002 and the control space 1003.

The power storage space 1002 may be a space that is opened and closed by the first door 1210. A battery rack 2000 including the batteries 5000 may be positioned in the power storage space 1002.

The control space 1003 may be a space that is opened and closed by the second door 1220, which may open toward the left or right side of the enclosure 1001 as described above. In the control space 1003, the control panel 3000 may be positioned to face one of the left and right surfaces of the enclosure 1001 to allow an operator to access the control panel 3000 in the control space 1003 through the second door 1220. The control panel 3000 has a relatively shallow depth, and by positioning the control panel 3000 to face the left or right surface, rather than the front surface, the dead space in the enclosure 1001 may be minimized. Through this, the length LT of the enclosure 1001 may be minimized.

The prior art control panel 3000 is typically positioned in the center of the enclosure 1001. When the control panel 3000 is positioned in the center, the distance between the control panel 3000 and each battery rack 2000 may be shortened. However, since the control panel 3000 is fixed to face the front surface, there is a problem of inefficient use of space. In the present embodiment, since the control panel 3000 is positioned in the control space 1003 provided on one side of the enclosure 1001, the control panel 3000 may be freely placed, such as without having to face the front surface. As a result, the control panel 3000 may be repositioned to face the left or right surface of the enclosure 1001, thereby minimizing the dead space inside the enclosure 1001. Here, the orientation of the control panel 3000 may be described based on the direction in which the door of the control panel 3000 is oriented.

Referring to FIG. 4, the enclosure 1001 of the present embodiment may include an explosion-proof door 1230. The explosion-proof door 1230 may discharge gases, generated by a thermal runaway inside the enclosure, to the outside. The explosion-proof door 1230 remains closed under normal conditions but opens in the event of a thermal runaway in a battery 5000 to allow the interior of the enclosure 1001 to communicate with the external environment. There may be one explosion-proof door 1230, or there may be multiple explosion-proof doors. The explosion-proof door 1230 may be positioned on a surface of the enclosure 1001 facing the second door 1220. However, it is also possible for the explosion-proof door 1230 to be provided at a position other than those described above.

Referring to FIGS. 7 and 8, the enclosure 1001 may include an air conditioner 1300 for dissipating heat from the batteries 5000. The air conditioner 1300 may be provided in a state coupled to the door 1200. As a result, the space occupied by the air conditioner 1300 inside the enclosure 1001 may be minimized.

In the present embodiment, the first door 1210 may be positioned to correspond to each battery rack 2000, and the air conditioner 1300 may be provided in the state coupled to the first door 1210 to allow the first door 1210 to correspond to each battery rack 2000. However, depending on the design, the number of first doors 1210 to be disposed may be more or fewer than the number of battery racks 2000, and accordingly, the range corresponding to each air conditioner 1300 may be set differently than the above-described range.

The air conditioner 1300 of the present embodiment may be in a form in which an indoor unit for cooling the interior and an outdoor unit for discharging heat to the exterior are coupled. As illustrated in FIG. 5, the air conditioner 1300 may include an outdoor inlet 1310 and an outdoor outlet 1320 positioned outside the enclosure 1001, thereby allowing the inflow of external air and the discharge of internal air. Referring to FIGS. 7 and 8, the air conditioner 1300 may include an indoor inlet 1330 and an indoor outlet 1340 positioned inside the enclosure 1001. The air discharged through the indoor outlet 1340 may move to the rear surface of the battery rack 2000, and the air moving from the rear surface to the front surface of the battery rack 2000 may cool the batteries mounted on the battery rack 2000.

A guide 1350 for directing the airflow may be positioned around the indoor outlet 1340. Through the guide 1350, the air discharged from the indoor outlet 1340 may be directed toward the top of the enclosure 1001 and then move to the rear surface of the battery rack 2000. When the air discharged from the air conditioner 1300 disperses into a large space, it may be difficult to form an airflow to cool the batteries 5000. Therefore, the guide 1350 may generate an airflow inside the enclosure 1001.

Hereinafter, the structure of the base 1100 of the battery enclosure 1000 according to the present embodiment is described.

Figure 9:
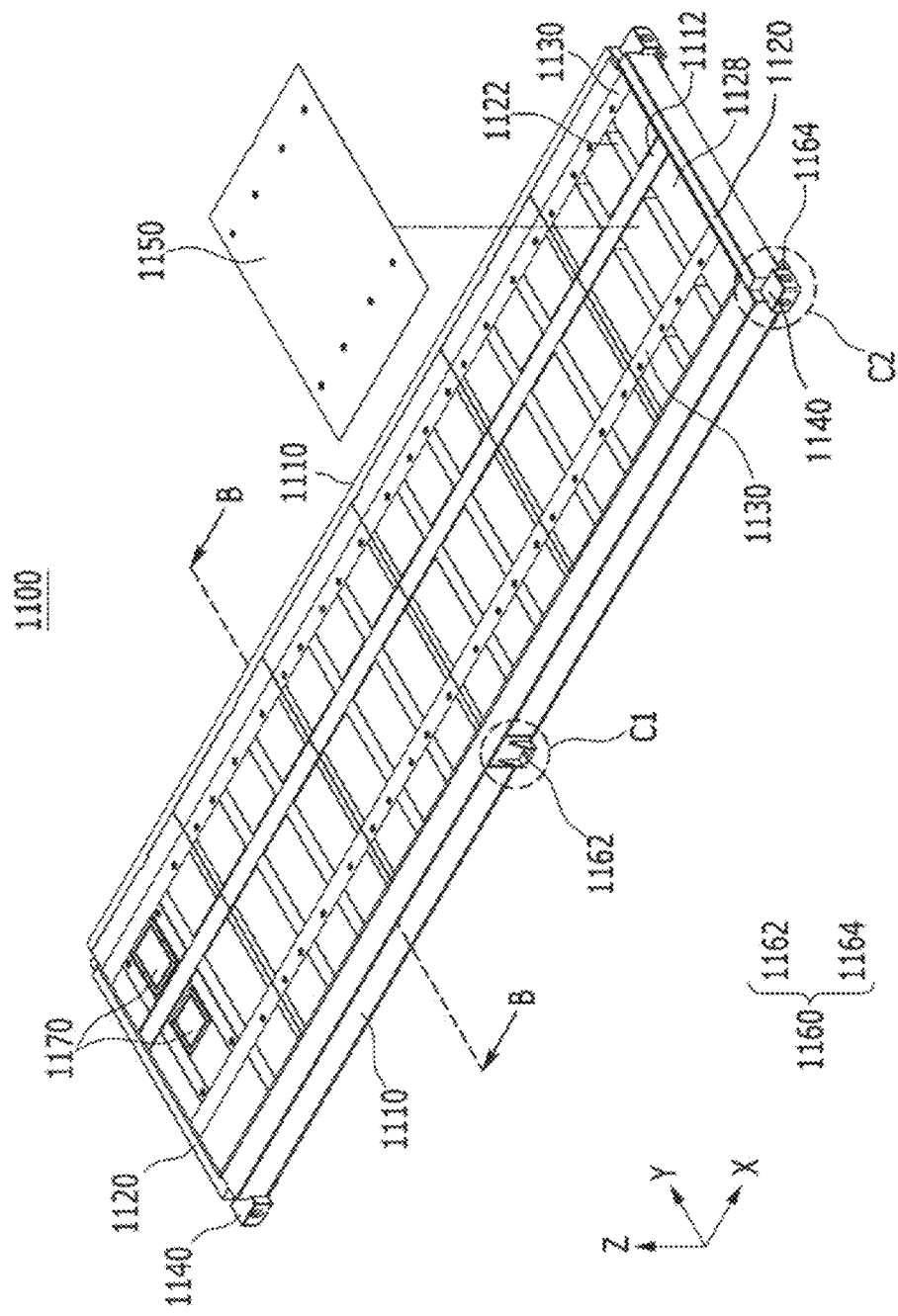
FIG. 9 is a perspective view of a base of a box included in the battery enclosure of FIG. 2.
Figure 11:
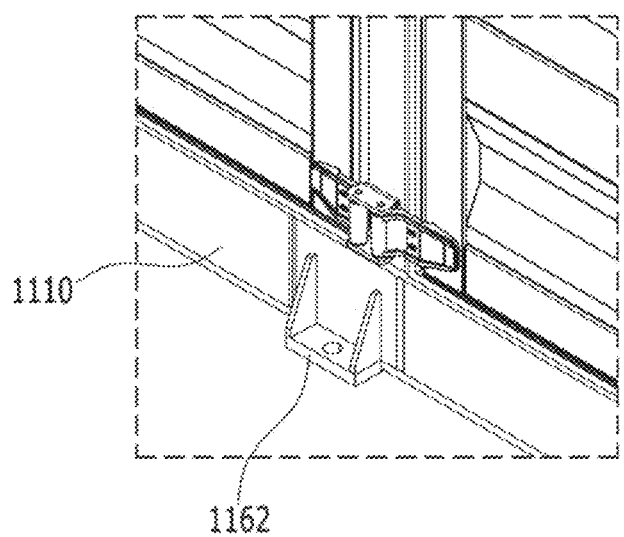
FIG. 11 is an enlarged view of part C1 of FIG. 9.
Figure 12:
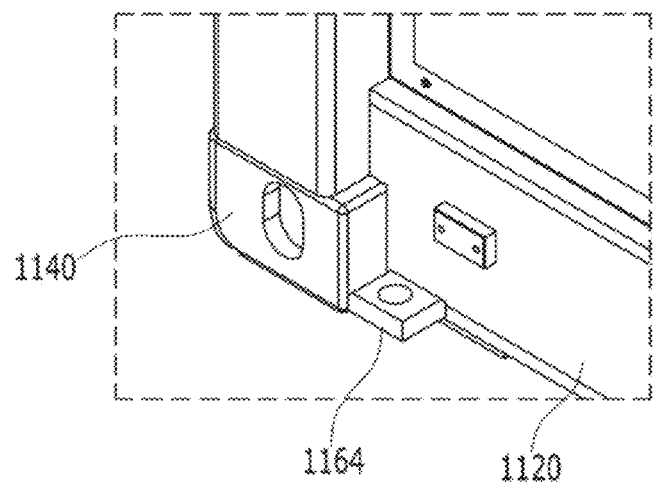
FIG. 12 is an enlarged view of part C2 of FIG. 9.

FIG. 9 is a perspective view of the base 1100 of the enclosure included in the battery enclosure of FIG. 2. FIG. 11 is an enlarged view of part C1 of FIG. 9. FIG. 12 is an enlarged view of part C2 of FIG. 9.

Referring to FIGS. 9 to 12, the enclosure 1001 of the present embodiment may include the base 1100. The base 1100 may include two horizontal beams 1110 facing each other and two vertical beams 1120 facing each other.

According to an embodiment, the two horizontal beams 1110 and the two vertical beams 1120 may form the outer shape of the base 1100. The horizontal beams 1110 and the vertical beams 1120 may be arranged perpendicularly, and one end of each horizontal beam and one end of each vertical beam 1120 may be mutually coupled to each other, thereby forming a rectangular shape. Here, couplers 1140 may each be provided to couple one end of a horizontal beam 1110 and one end of a vertical beam 1120. However, one end of each horizontal beam 1110 and one end of each vertical beam 1120 may also be coupled by another feature other than the coupler 1140.

The horizontal beams 1110 may be structures extending in the length direction of the enclosure 1001 (e.g., the X-axis direction). The vertical beams 1120 may be structures extending along the depth direction of the enclosure 1001 (e.g., the Y-axis direction). The length of the horizontal beams 1110 may be greater than the length of the vertical beams 1120.

Figure 10:
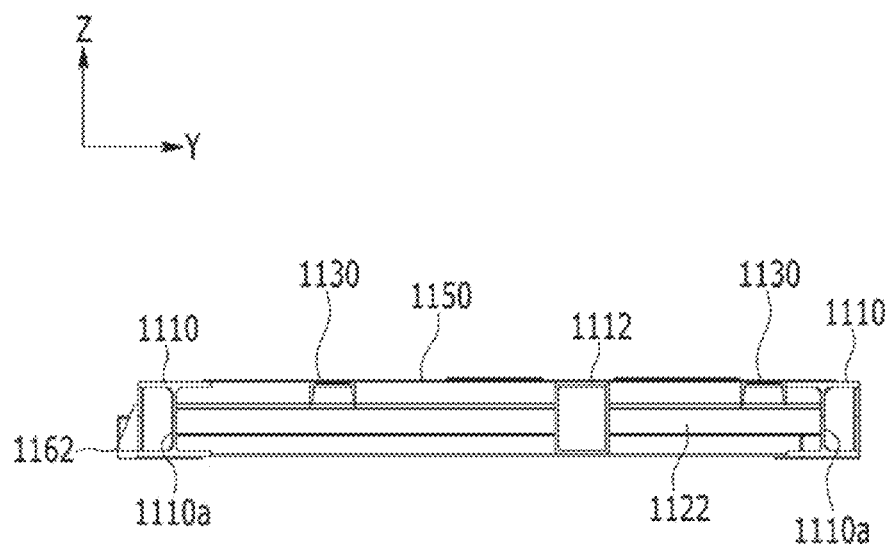
FIG. 10 is a cross-sectional view taken along line B-B in FIG. 9.

Referring to FIG. 10, each horizontal beam 1110 may include therein a partition 1110a, which may further enhance the rigidity of the horizontal beam 1110. Due to the partition 1110a, the axial cross-sectional shape of the horizontal beam 1110 may include an I-shape. The cross-section of the horizontal beam 1110 may have a shape in which at least one of the opposite open sides of the I-shape is closed. Here, the term "axial cross-section" may refer to a section obtained by cutting the horizontal beam 1110 perpendicular to the axis in the length direction.

Depending on the design, partitions may also be positioned inside the vertical beams 1120, as well as the horizontal beams 1110.

A plate-like member 1150 may be positioned on the two horizontal beams 1110 and the two vertical beams 1120. The plate-like member 1150 may form the top surface of the base 1100. There may be one plate-like member 1150, or, as illustrated in FIG. 9, multiple plate-like members may be provided. A battery rack 2000 may be placed on the plate-like member 1150. Multiple holes may be formed in the plate-like member 1150, and while the battery rack 2000 is positioned on the plate-like member 1150, fasteners such as bolts may be inserted into the holes in the plate-like member 1150, thereby fixing the battery rack 2000 to the base 1100.

A sub-horizontal beam 1112 may be positioned, between the two horizontal beams 1110. The sub-horizontal beam 1112 may be positioned parallel to the horizontal beams 1110. A sub-vertical beam 1122 may be positioned between the two vertical beams 1120. The sub-vertical beam 1122 may be positioned parallel to the vertical beams 1120. Since the sub-horizontal beam 1112 supports the plate-like member 1150 along with the horizontal beams 1110, the battery rack 2000 may be stably supported by the base 1100. In addition, since the sub-vertical beam 1122 extends between the two horizontal beams 1110 or between a horizontal beam 1110 and the sub-horizontal beam 1112, the rigidity of the base 1100 structure may be enhanced.

The sub-horizontal beam 1112 may be a structure extending perpendicularly between the two vertical beams 1120. The sub-vertical beam 1122 may be a structure extending perpendicularly between one of the two horizontal beams 1110 and the sub-horizontal beam 1112.

The ends of the sub-vertical beam 1122 may be in contact with the partitions 1110a of the horizontal beams 1110. By fixing the sub-vertical beam 1122 to the partitions 1110a, the structural stability of the base 1100 may be enhanced.

The horizontal beams 1110, the vertical beams 1120, the sub-horizontal beam 1112, and the sub-vertical beam 1122 may be arranged parallel to or perpendicular to each other, thereby forming a grid space between these beams 1110, 1120, 1112, and 1122. Thermal insulation material 1128 may be provided in the aforementioned grid space.

The cross-section of the sub-vertical beam 1122 may be smaller than that of the vertical beams 1120, and the sub-vertical beam 1122 may be positioned relatively inside the base 1100 compared to the other beams 1110, 1120, and 1112. As a result, a spacing may be formed between the sub-vertical beam 1122 and the plate-like member 1150, and within this spacing, a rack fixing beam 1130 may be positioned.

The rack fixing beam 1130 may stably fix the base 1100 and the battery rack 2000. The rack fixing beam 1130 may be positioned at the coupling position of the battery rack 2000 and the base 1100. The rack fixing beam 1130 may extend parallel to the horizontal beams 1110 between the two horizontal beams 1110. The rack fixing beam 1130 may be a structure extending perpendicular to the two vertical beams 1120 between the two vertical beams 1120. The cross-section of the rack fixing beam 1130 may be smaller than that of the horizontal beams 1110. The rack fixing beam 1130 may be positioned above the sub-vertical beams 1122 to be supported by the sub-vertical beam 1122.

Holes, corresponding to the holes in the plate-like member 1150, may be formed in the rack fixing beam 1130, and the holes in the rack fixing beam 1130. When the holes in the rack fixing beam 1130 and the holes in the plate-like member 1150 are aligned on the same axis, fasteners penetrating the bottom of the battery rack 2000 may be inserted into the aforementioned holes, thereby stably fixing the battery rack 2000 and the base 1100.

The base 1100 may include fixtures 1160 for stably fixing the enclosure 1001 to an installation surface. The fixtures 1160 may include holes, and fasteners such as bolts and washers may be inserted into the holes, thereby fixing the enclosure 1001 to the installation surface.

Referring to FIGS. 11 and 12, the fixtures 1160 may include a middle fixture 1162 and a corner fixture 1164.

As illustrated in FIG. 11, the middle fixture 1162 may be formed on the outer surface of each horizontal beam 1110. The middle fixture 1162 may include a bottom surface having a hole and a support surface extending between the bottom surface and a horizontal beam 1110. The support surface may have a triangular shape extending perpendicularly from an edge of the bottom surface and connected to the horizontal beam 1110.

The middle fixture 1162 may be positioned between two corner fixtures 1164 and may not necessarily be positioned in the center of the horizontal beam 1110 in the length direction. For example, the middle fixture 1162 may be positioned closer to one corner fixture 1164 than the other. In the example of FIG. 9, the middle fixture 1162 may be positioned closer to the corner fixture 1164 on the −Y axis than to the corner fixture 1164 on the +Y axis. This will be explained in more detail in FIGS. 13 and 14.

As illustrated in FIG. 12, each corner fixture 1164 may be positioned adjacent to a coupler 1140. The corner fixture 1164 may include a surface having a hole. One edge of the surface of the corner fixture 1164 may be adjacent to the coupler 1140. Another edge of the surface of the corner fixture 1164, perpendicular to the aforementioned edge, may be adjacent to a vertical beam 1120. The corner fixture 1164 may be coupled to the vertical beam 1120 or the coupler 1140. In other words, the corner fixture 1164 may be formed at an end of the vertical beam 1120. Alternatively, the corner fixture 1164 may be formed on the coupler 1140.

In FIG. 12, the corner fixture 1164 is illustrated as being positioned between the vertical beam 1120 and the coupler 1140. Alternatively, the corner fixture 1164 may be positioned closer to a horizontal beam 1110 and the coupler 1140. In such a case, two perpendicular edges of the surface of the corner fixture 1164 may be adjacent to the coupler 1140 and the horizontal beam 1110, respectively. In this case, the corner fixture 1164 may be formed at an end of the horizontal beam 1110.

As the number of fixtures 1160 increases, the enclosure 1001 may be fixed to the installation surface more stably. However, when the number of fixtures 1160 increases, the complexity of the installation process also increases, which leads to a longer installation time and greater worker fatigue. Therefore, the fixtures 1160 formed on the enclosure 1001 in the present embodiment are provided in a minimal number by optimizing their positions.

Figure 13:
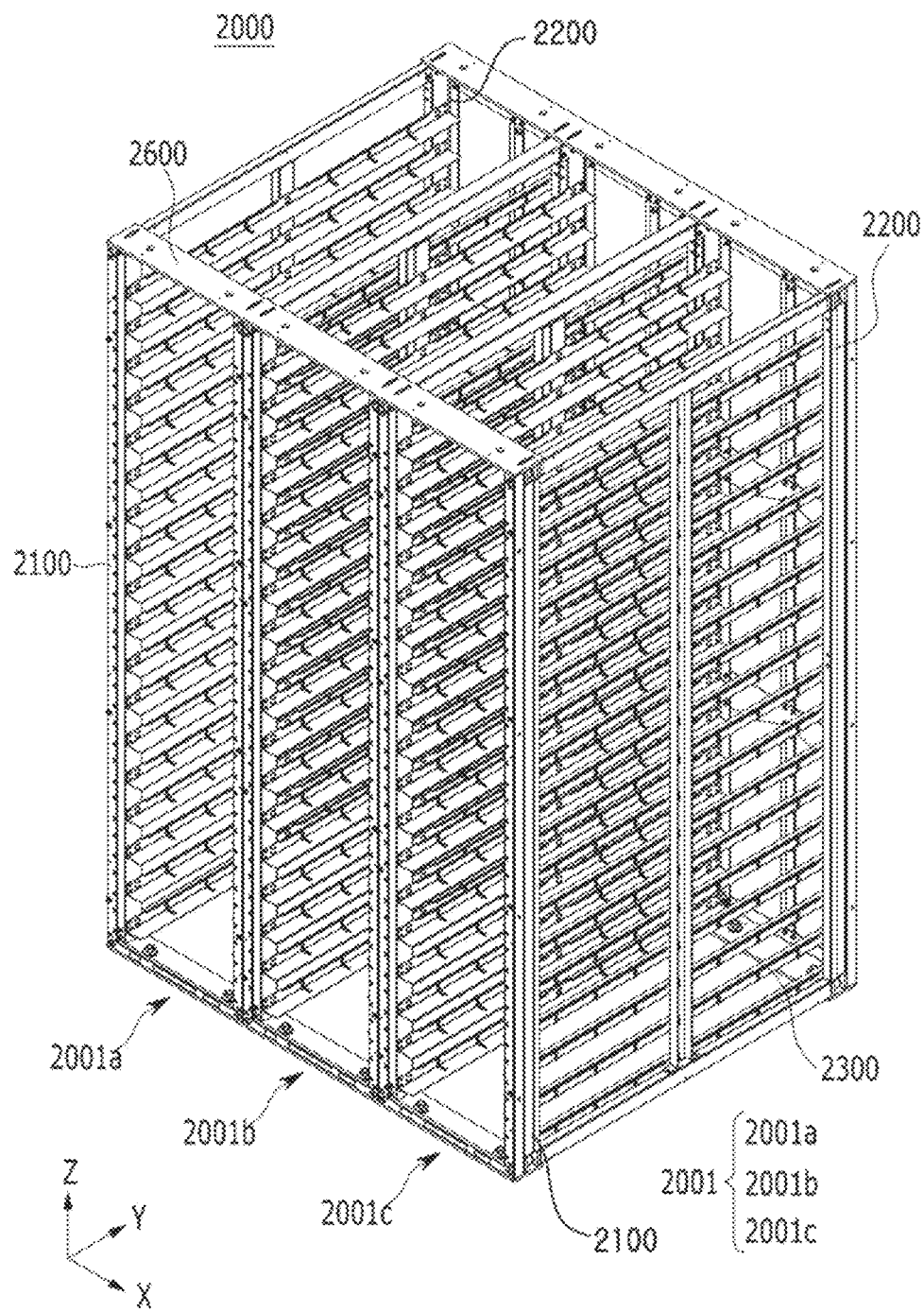
FIG. 13 is a perspective view of a battery rack included in the battery enclosure of FIG. 2.
Figure 14:
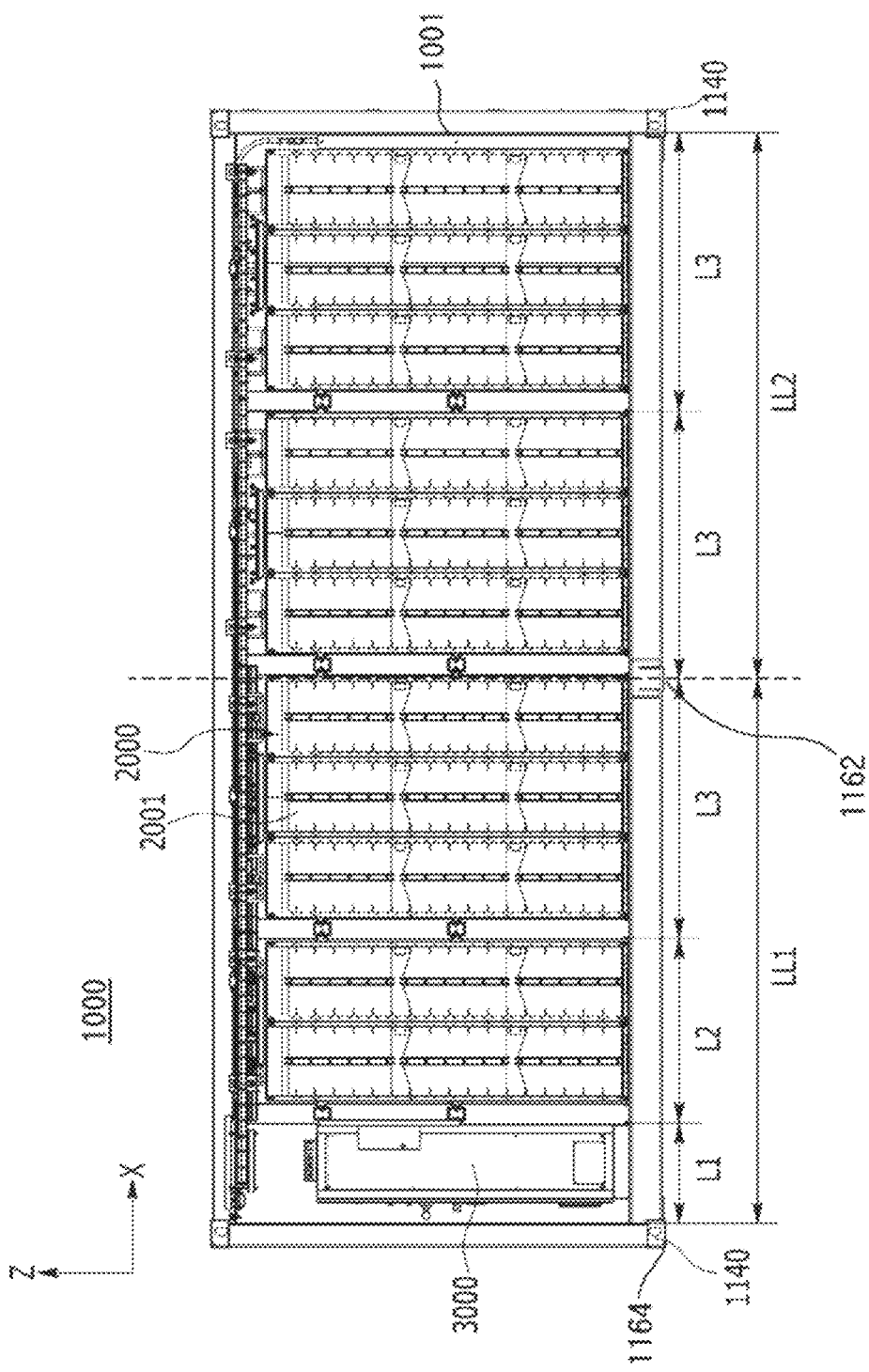
FIG. 14 is a view illustrating positions of fixtures in the battery enclosure of FIG. 2.

FIG. 13 is a perspective view of a battery rack 2000 included in the battery enclosure 1000 of FIG. 2. FIG. 14 is a view illustrating the positions of the fixtures 1160 in the battery enclosure 1000 of FIG. 2.

Referring to FIGS. 13 and 14, multiple battery racks 2000 may be positioned inside the enclosure 1001 of the present embodiment. Here, each battery rack 2000 may be provided in a structure that includes multiple sub-racks 2001, such as a first sub-rack 2001*a*, a second sub-rack 2001*b*, and a third sub-rack 2001*c*.

Referring to FIG. 13, each sub-rack 2001 may include columns 2100 and 2200 extending in the vertical direction, and brackets 2300 coupled to these columns 2100 and 2200 to form spaces where the batteries 5000 are seated.

The columns 2100 and 2200 may include a front column 2100 and a rear columns 2200. Since two front columns 2100 and two rear columns 2200 have a rectangular column shape, the overall outer shape of the sub-racks 2001 or the battery rack 2000 may be formed.

Adjacent sub-racks 2001 may be coupled to each other. By coupling two columns 2100 and 2200 which are included in the two sub-racks 2001, respectively, and are positioned adjacent to each other, two neighboring sub-racks 2001 may be coupled. Two adjacent columns 2100 and 2200 may be coupled by a connecting block (not illustrated) positioned between two sub-racks 2001. The two adjacent columns 2100 and 2200 may also be coupled by a support frame 2600 that crosses the upper ends or the lower ends of the two sub-racks 2001.

In FIG. 13, the battery rack 2000 is illustrated as including three sub-racks 2001, However, alternatively, the battery rack 2000 may include two sub-racks 2001. In addition, depending on design changes, the battery rack 2000 may include additional sub-racks 2001.

As illustrated in FIG. 9, the position of the fixtures 1160 in the present embodiment may be determined based on the structure of the battery rack 2000. According to an embodiment, the fixtures 1160 of the present embodiment may be provided at positions corresponding to the columns 2100 and 2200 of the battery rack 2000. The middle fixtures 1162 may be positioned to correspond to the columns 2100 and 2200 of the battery rack 2000. Here, being positioned to correspond may mean that the fixtures 1160 or the middle fixtures 1162 may be provided on extension lines in the direction in which the columns 2100 and 2200 of the battery rack 2000 extend (the Z-axis direction).

Typically, a middle fixture 1162 may be positioned in the center in the length direction (e.g., the X-axis direction) to support the enclosure 1001 stably. However, as described earlier, the middle fixture 1162 may not necessarily be positioned in the center in the length direction (e.g., the X-axis direction). When there are multiple middle fixtures 1162, the middle fixtures 1162 may be arranged at equal intervals.

In the battery enclosure 1000 of the present embodiment, most of the weight may be due to the battery rack 2000, and the weight in the battery rack 2000 may be concentrated on the columns 2100 and 2200. Therefore, in order to enhance the stability of the battery enclosure 1000, the middle fixtures 1162 may be positioned to correspond to the columns 2100 and 2200 of the battery rack 2000 rather than being positioned in the center.

As illustrated in FIG. 14, three battery racks 2000, each of which includes three sub-racks 2001, may be positioned inside the enclosure 1001 of the present embodiment, and one battery rack 2000 including two sub-racks 2001 may be positioned at the far left. The control panel 3000 may be positioned adjacent to the battery rack 2000 which includes two sub-racks 2001.

When the middle fixtures 1162 do not correspond to the columns 2100 and 2200) of the battery racks 2000, the weight of the battery racks 2000 may be concentrated in relatively unstable positions, which may cause the battery racks to be unstably fixed or excessive stress to be formed in vulnerable portions, which may lead to the damage of the enclosure 1001. Therefore, in the present embodiment, the middle fixtures 1162 are positioned to correspond to the columns 2100 and 2200 of the battery racks 2000, thereby allowing the stress applied to the base 1100 of the enclosure 1001 by the battery racks 2000 to be concentrated around the middle fixtures 1162.

Accordingly, the positions of the middle fixtures 1162 in the length direction of the enclosure 1001 (e.g., the X-axis direction) may be close to the center of the enclosure 1001, but may also be spaced a certain distance from the center.

According to an embodiment of the present disclosure, the length LT of the enclosure 1001 may vary depending on the length of the battery racks 2000 and the size of the control panel 3000. In the present embodiment, since the control panel 3000 is disposed to face either the left or right surface of the enclosure 1001, the depth of the control panel 3000 may affect the length LT of the enclosure 1001. Here, the size of the control panel 3000 in the length direction of the enclosure 1001 (the X-axis direction) may be referred to as a first length L1. The size of the control panel 3000 in the length direction of the enclosure 1001 (the X-axis direction) may correspond to the depth of the control panel 3000. In addition, the length of the battery rack 2000, which includes two sub-racks 2001, may be referred to as a second length L2. The length of the battery rack 2000, which includes three sub-racks 2001, may be referred to as a third length L3.

The first length L1, the second length L2, and the third length L3 may include at least a portion of a margin space provided on each of opposite sides of the control panel 3000 or the battery racks 2000. Therefore, the first length L1 may refer to the size of the space occupied by the control panel 3000, and it may be greater than the depth of the control panel 3000. The second length L2 and the third length L3 may be greater than the lengths of the corresponding battery racks 2000.

Referring back to FIG. 14, the middle fixtures 1162 may be positioned at a distance of a first fixing length LL1 and a second fixing length LL2 from the opposite ends of the enclosure 1001 in the length direction (the X-axis direction). At this time, the opposite ends of the enclosure 1001 in the length direction (the X-axis direction) may be referred to without considering the main columns 1190. Here, the first fixing length LL1 may be the sum of the first length L1, the second length L2, and the third length L3. The second fixing length LL2 may be twice the third length L3. The internal space of the enclosure 1001 corresponding to the first fixing length LL1 may be referred to as a first space. The internal space of the enclosure 1001 corresponding to the second fixing length LL2 may be referred to as a second space.

According to an embodiment, the first fixed length LL1 may be greater than the second fixed length LL2. As illustrated in FIG. 14, five sub-racks 2001 may be positioned in the first space corresponding to the first fixed length LL1. Six sub-racks 2001 may be positioned in the second space corresponding to the second fixed length LL2. At least five sub-racks 2001 may be positioned between the middle fixed portions 1162 and the corner fixed portions 1164. At least five columns may be positioned between the middle fixtures 1162 and the corner fixed portions 1164.

In the second space corresponding to the second fixed length LL2, more batteries 5000 may be positioned than in the first space corresponding to the first fixed length LL1. Accordingly, the weight of the first space may be smaller than that of the second space. In this way, the size of the second space having a larger weight may be formed smaller than that of the first space having a smaller weight. When applying the principle of a lever, the middle fixtures 1162, which are positioned to be slightly off-centered, may support the enclosure 1001 more stably than when positioned evenly.

The principle of the lever refers to the concept that the product of the distance between the fulcrum and the point of action and the weight of the object at the point of action is equal to the product of the distance between the fulcrum and the point of force and the force applied to the lever.

Figure 15:
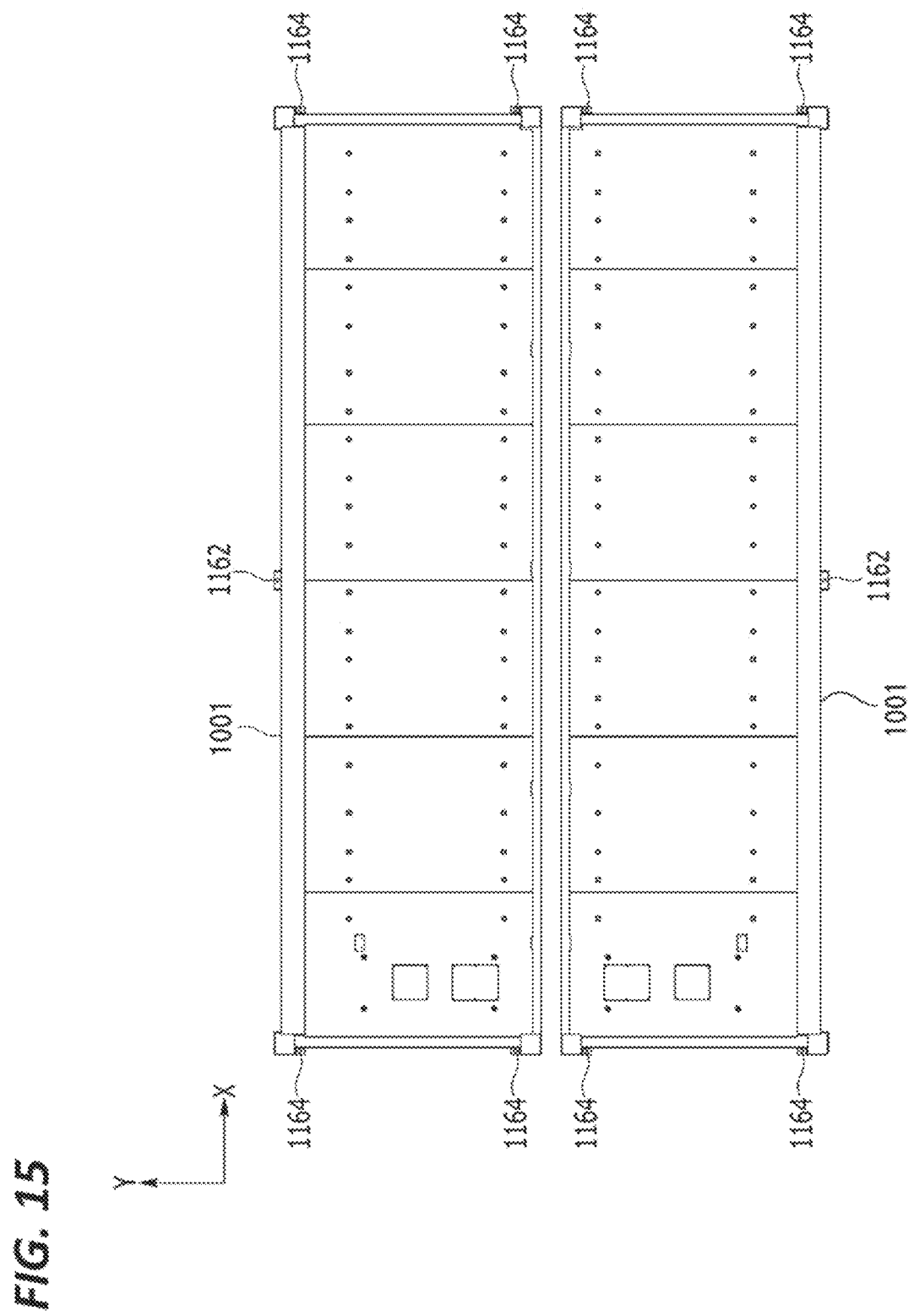
FIG. 15 is a view illustrating, when there are multiple battery enclosure of FIG. 2, an array of the battery enclosures.
Figure 16:
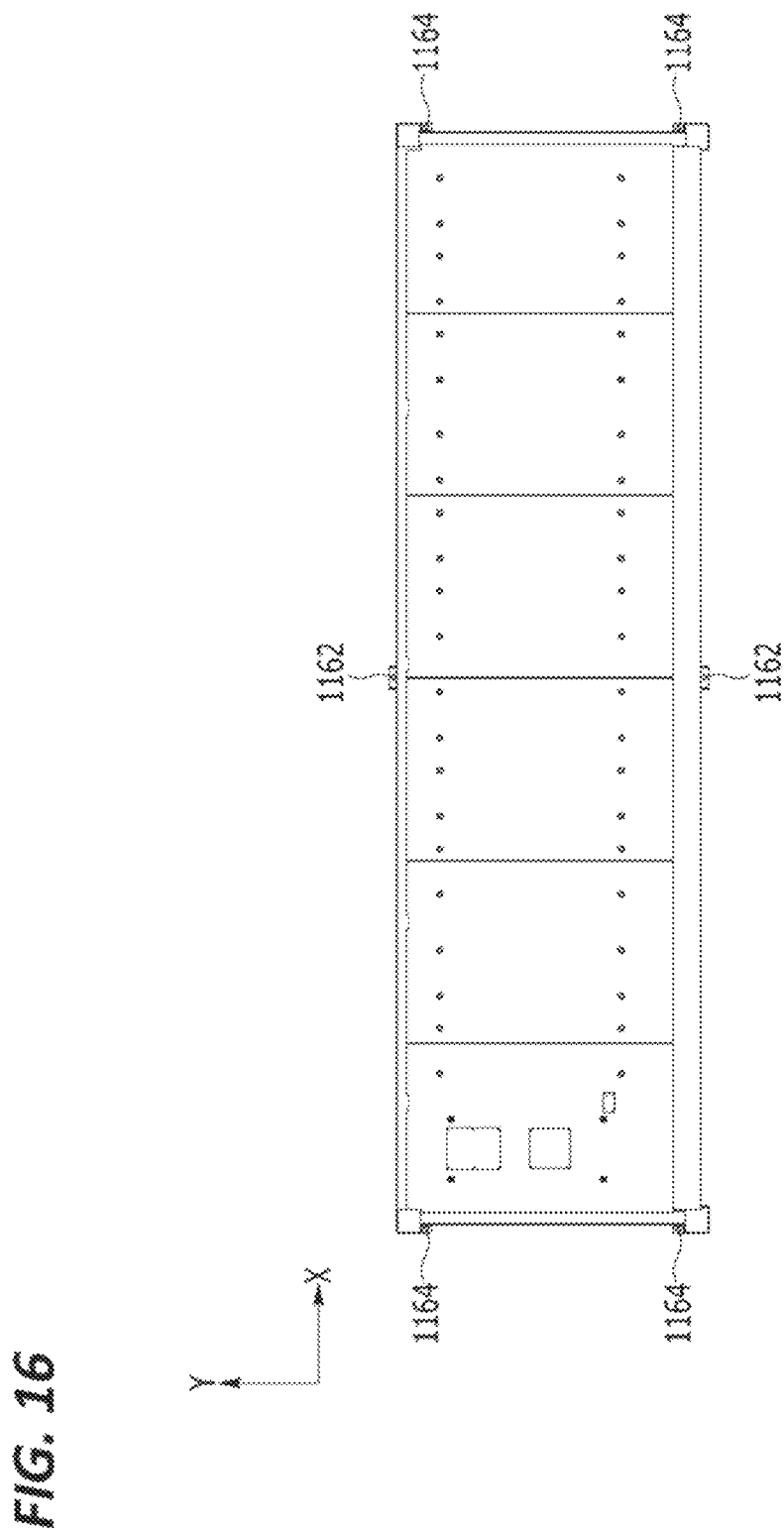
FIG. 16 is a view illustrating a modification of the base included in the battery enclosure of FIG. 2.

FIG. 15 is a view illustrating, when there are multiple battery enclosures of FIG. 2, an array of the battery enclosures. FIG. 16 is a view illustrating a modification of the base included in the battery enclosure of FIG. 2.

Referring to FIGS. 15 and 16, in the present embodiment, corner fixtures 1164 may be individually provided at respective corners of each enclosure 1001. For example, there may be four corner fixing parts 1164.

One middle fixture 1162 may be provided on one horizontal beam 1110 included in each enclosure 1001. Here, more than one middle fixture 1162 may be provided, but as described above, in the present embodiment, since the middle fixing part 1162 is positioned to correspond to the columns 2100 and 2200 of the battery rack 2000, more than one middle fixture 1162 may be unnecessary.

As illustrated in FIG. 15, when multiple enclosures 1001 are provided in the installation space, two enclosures 1001 may be disposed with their rear surfaces facing each other. In the present embodiment, since there is no door provided on the rear surfaces of the enclosures 1001, the spacing distance between the two enclosures 1001 with their rear surfaces facing each other may be relatively small. As a result, when, for example, vibrations occur, the two enclosures 1001 may support each other by their rear surfaces, which may make the middle fixtures 1162 on the rear horizontal beams 1110 unnecessary. Therefore, in such a case, the minimum number of fixtures 1160 formed on the enclosures 1001 may be five. For example, the fixtures 1160 of the enclosures 1001 may include one middle fixture 1162 and four corner fixtures 1164.

As illustrated in FIG. 16, when an enclosure 1001 is provided alone in the installation space or when two adjacent enclosures 1001 are disposed with their left or rear surfaces facing each other, two middle fixtures 1162 may be respectively provided on two horizontal beams 1110 to ensure stable fixation of the rear sides of the enclosures 1001. Therefore, in this case, the minimum number of fixtures 1160 provided on the enclosures 1001 may be six.

That is, the fixtures 1160 may include two middle fixtures 1162 and four corner fixtures 1164.

Hereinbelow, the electrical connection relationships of the battery enclosures 1000 included in the energy storage system according to the present embodiment are described.

Figure 17:
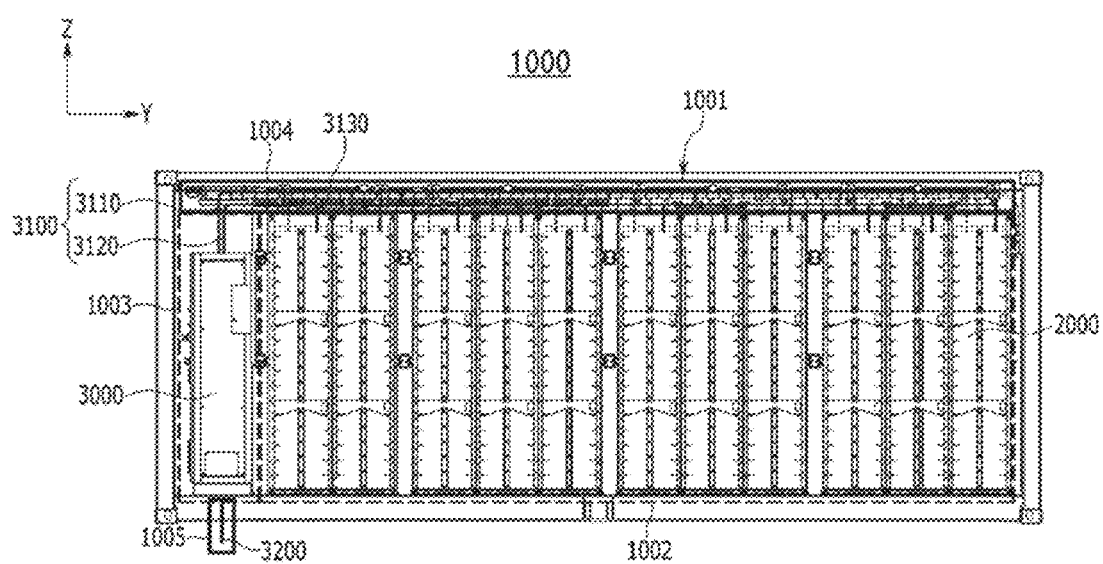
FIGS. 17 to 19 are views illustrating an electrical connection structure inside the battery enclosure according to an embodiment of the present disclosure.
Figure 18:
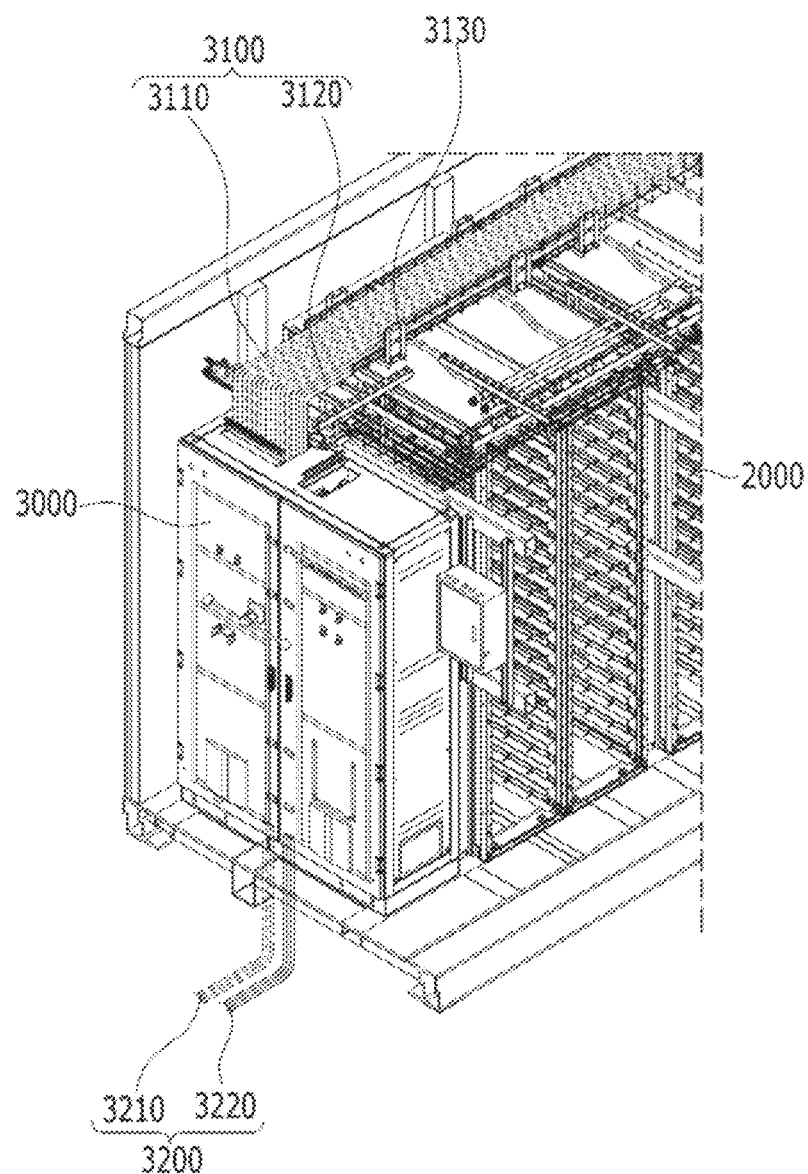
Figure 19:
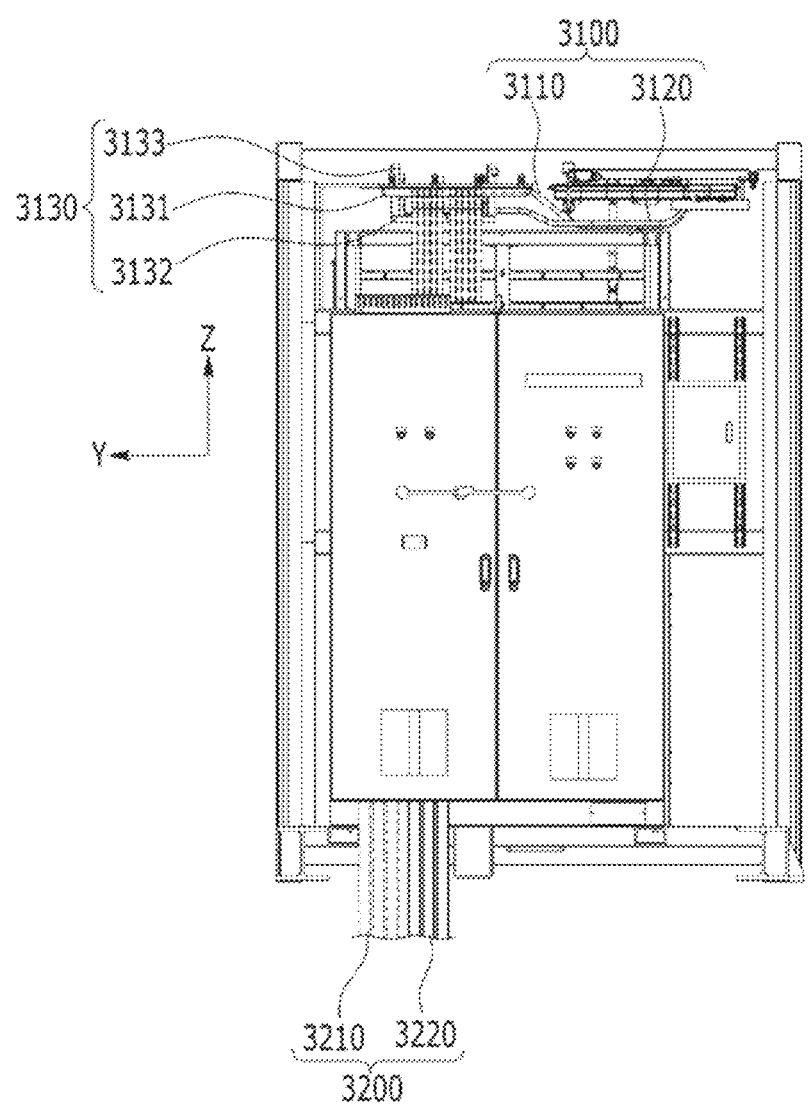
Figure 20:
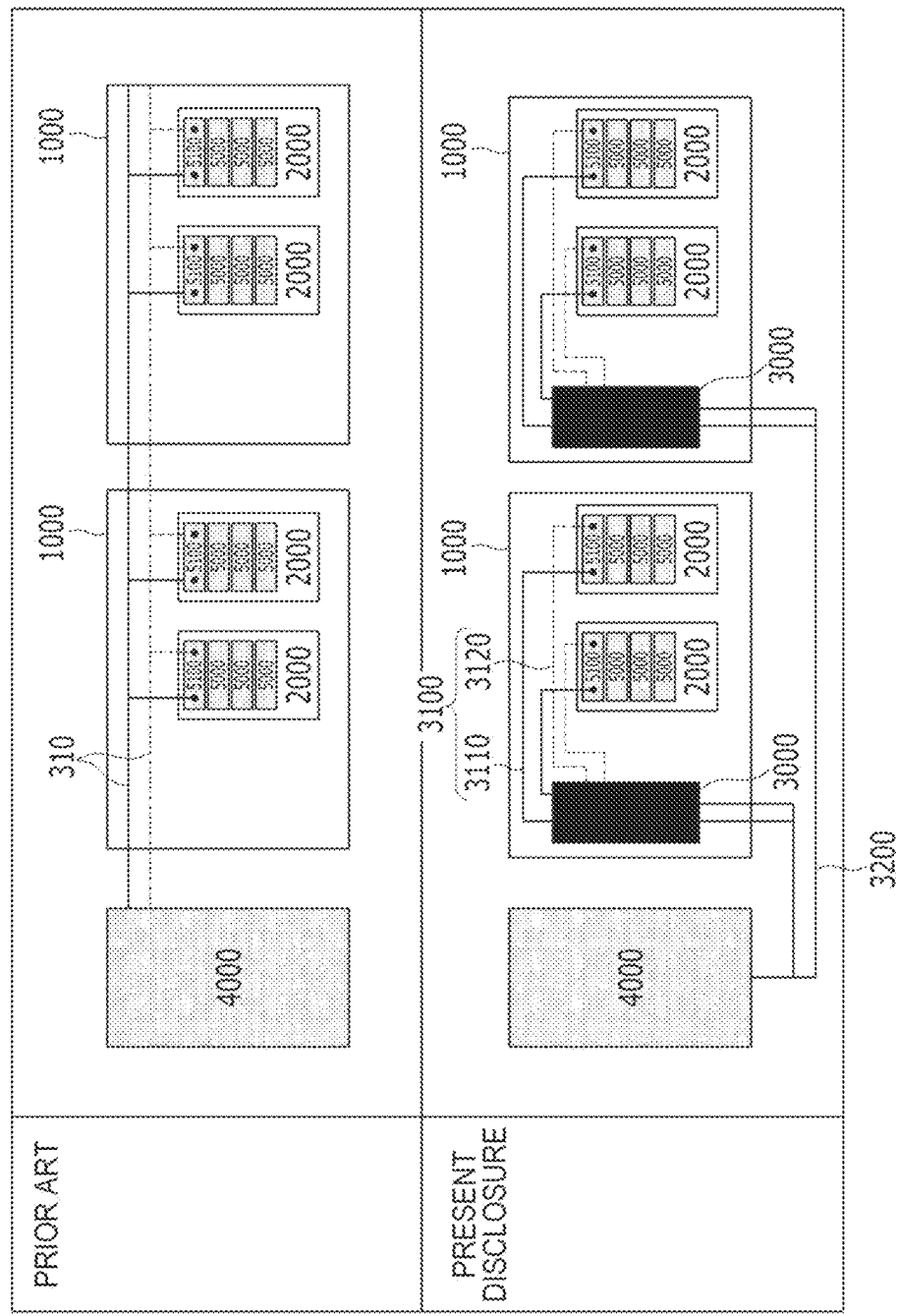
FIG. 20 is a view illustrating an electrical connection structure of an energy storage system according to an embodiment of the present disclosure.

FIGS. 17 to 19 are views illustrating an electrical connection structure inside the battery enclosure 1000 according to an embodiment of the present disclosure. FIG. 20 is a view illustrating the electrical connection structure of the ESS 1 according to an embodiment of the present disclosure, in comparison with the prior art.

In FIG. 20, for ease of explanation, the sub-racks 2001 in the battery rack 2000 are omitted from the illustration, but this does not limit the structure of the battery rack 2000 in the present embodiment. For example, the battery rack 2000 may include two or more sub-racks 2001, and a first cable 3100 extending from the control panel 3000 may be connected to each sub-rack 2001. In addition, the first cable 3100 may be connected to a control unit 5100 located at the top of the sub-rack 2001.

Referring to FIGS. 17 to 20, the battery enclosure 1000 in the present embodiment may receive power from an external electrical device, such as a PCS or the control cabinet 4000, and may include cables 3100 and 3200 for power supply.

The cables 3100 and 3200, which include first cables 3100 and second cables 3200, may transmit charging power and discharging power. The cables 3100 and 3200 may transmit charging power supplied to the battery enclosure 1000 and/or discharging power released from the battery enclosure 1000. The cables 3100 and 3200 may also transmit charging power supplied to the battery racks 2000 and/or discharging power released from the battery racks 2000. The cables 3100 and 3200 may be connected to the control panel 3000 positioned inside the battery enclosure 1000. The cables 3100 and 3200 may electrically connect the control panel 3000 of the battery enclosure 1000 to the control cabinet 4000. The cables 3100 and 3200 may electrically connect the control panel 3000 to the battery racks 2000 within the battery enclosure 1000.

The first cables 3100 may extend within the battery enclosure 1000 and may form electrical connections between the electrical devices located inside the enclosure 1001. The first cables 3100 may form electrical connection between the control panel 3000 and the battery racks 2000.

Referring to FIG. 20, battery racks 2000 may each include a control unit 5100. The control unit 5100 may be positioned at the top or bottom of each column of the battery racks 2000, i.e., at the top or bottom of each sub-rack 2001. The batteries 5000 stacked in each column may be connected in series, and the battery 5000 located at the top or bottom of each column may be electrically connected to the control unit 5100. The control units 5100 of the battery racks 2000 may be electrically connected to the control panel 3000 via the first cables 3100. In this way, batteries 5000 may be supplied with power through control units 5100.

The control units 5100 may each be connected to the BMS that collects state information of the battery racks 2000 and transmits the collected information to, for example, the control panel 3000 or the control cabinet 4000. The BMS connected to a control unit 5100 may be referred to as a "rack BMS." According to an embodiment, the rack BMS may be described as being included in the control unit 5100.

In addition, each battery 5000 may also include a BMS that collects state information of the battery 5000 and transmits the collected information to, for example, the control unit 5100 or the rack BMS. The BMS included in the battery 5000 may be referred to as a "battery BMS." The rack BMS and/or the battery BMS may transmit the collected information to an external device or may receive information from an external device. For example, the control unit 5100 of a battery 5000 or a battery rack 2000 may be provided with a communication device for the transmission and/or reception of information from the rack BMS and/or battery BMS.

The first cables 3100 may include multiple positive cables 3110 and multiple negative cables 3120. One end of each of positive and negative cables 3110 and 3120 is connected to the control panel 3000, and the other end may be connected to the control unit 5100 positioned in each column of the battery rack 2000. Through this, each control unit 5100 may be connected in parallel to the control panel 3000. In this way, by connecting each battery rack 2000 in parallel to the control panel 3000, when a malfunction or fire in a specific battery 5000 is identified by the BMS, the relevant battery rack 2000 may be electrically isolated through the control unit 5100, thereby preventing further problematic phenomena.

The first cables 3100 may extend from one side to the other of the enclosure 1001 in the length direction (e.g., X-axis direction). In the present embodiment, the first cables 3100 may extend from the control space 1003, where the control panel 3000 is positioned, toward the power storage space 1002, where the battery racks 2000 are positioned. The first cables 3100 may be drawn out from the top of the control panel 3000. An opening through which the first cables 3100 pass may be positioned at the top of the control panel 3000 or near the same.

The first cables 3100 may be positioned at the top of the enclosure 1001. The first cables 3100 may extend upward from the top of the control panel 3000 and may extend from one side to the other within the upper portion of the enclosure 1001 to access each control unit 5100 located at the top of each battery rack 2000. Here, the space through which the first cables 3100 extend to connect the control panel 3000 and the battery racks 2000 may be referred to as a first power distribution space 1004. The first power distribution space 1004 may be positioned at the top of the enclosure 1001. Considering the positions of the first cables 3100, the first cables 3100 may also be referred to as roof cables.

In the prior art, for example, busbars 310 (see, e.g., in FIG. 20) are provided in place of the first cables 3100 of the present embodiment. Therefore, in the prior art, after placing battery racks 2000 inside the enclosure 1001, the battery racks 2000 are electrically connected to the busbars 310 through a welding process at the top of the battery racks 2000. However, in the present embodiment, since the first cables 3100 are used, for example, a welding process is unnecessary, and electrical connections may be formed more easily. In addition, since other structures required to insulate the busbars 310 are omitted, the internal space of the enclosure 1001 may be utilized more efficiently.

Since multiple first cables 3100 extending to the battery rack 2000 are positioned in the first power distribution space 1004, when the positions of the first cables 3100 are not organized in advance, for example, tangling between the first cables 3100 may occur. In addition, for example, the tangling between the first cables 3100 may lead to fire or malfunction of the battery enclosure 1000. However, the battery enclosure 1000 of the present embodiment may be provided with a cable tray 3130 on which the first cables 3100 are placed, thereby minimizing the aforementioned problems.

Referring to FIG. 17, the cable tray 3130 may be positioned in the first power distribution space 1004. The first cables 3100 may be effectively organized by being placed on the cable tray 3130, which facilitates the maintenance and repair of the battery enclosure 1000.

Referring to FIG. 19, the cable tray 3130 may have a two-stage structure. The cable tray 3130 may include an upper tray 3131, a lower tray 3132, and a bracket 3133 supporting the upper and lower trays. One of the upper tray 3131 and the lower tray 3132 may accommodate the positive cables 3110, while the other may accommodate the negative cables 3120.

One of the multiple positive cables 3110 and one of the multiple negative cables 3120, positioned on the cable tray 3130, may be connected to each battery rack 2000 or sub-rack 2001. Here, the multiple positive cables 3110 and/or negative cables 3120 positioned on each tray 3131 or 3132 may be positioned side by side along the depth direction of the enclosure 1001 (the Y-axis direction).

Among the positive cables 3110 and/or negative cables 3120 positioned side by side along the depth direction (e.g., the Y-axis direction), the one positioned closer to the front side (e.g., the −Y axis direction) may be connected to a battery rack 2000 or sub-rack 2001 positioned closer to the control panel 3000. For example, the positive cable 3110 and/or negative cable 3120 closest to the first door 1210 may be connected to the battery rack 2000 or sub-rack 2001 positioned closest to the control panel 3000. Conversely, the cables positioned closer to the rear side (e.g., the +Y axis direction) may be connected to the battery rack 2000 or sub-rack 2001 located farther from the control panel 3000. For example, the positive cable 3110 and/or negative cable 3120 farthest to the first door 1210 may be connected to the battery rack 2000 or sub-rack 2001 positioned farthest to the control panel 3000. This may be because the first cables 3100 are connected to the front surfaces of the battery racks 2000 or sub-racks 2001. Therefore, when the first cables 3100 are connected to the rear surfaces of the battery racks 2000 or sub-racks 2001, the aforementioned connection positions may be reversed.

In this way, by arranging the positive cables 3110 and the negative cables 3120 vertically using the cable tray 3130, interference between the first cables 3100 may be prevented. In addition, as the positions of the positive cables 3110 and the negative cables 3120 are predetermined, the connections between the first cables 3100 and the battery racks 2000 may be made more easily.

In FIG. 19, it is illustrated that the positive cables 3110 is positioned on the upper tray 3131 and the negative cables 3120 are positioned on the lower tray 3132. But without being limited thereto, the positive cables 3110 may be positioned on the lower tray, and the negative cables 3120 may be positioned on the upper tray.

In the foregoing description, the positive cables 3110 and the negative cables 3120 have been described as being positioned on the upper tray 3131 and the lower tray 3132 of the cable tray 3130, respectively, but are not limited thereto.

For example, the positive cables 3110 and the negative cables 3120 may be positioned together on the upper tray 3131, and the positive cables 3110 and the negative cables 3120 may be positioned together on the lower tray 3132. In this case, the positive cables 3110 may be positioned on one of the front and rear sides of each tray 3131 or 3132, and the negative cables 3120 may be positioned on the other. In addition, the positive cables 3110 and the negative cables 3120 positioned on the upper tray 3131 may be connected to the battery racks 2000 or sub-racks 2001 positioned at relatively long/short distances, while the positive cables 3110 and the negative cables 3120 positioned on the lower tray 3132 may be connected to battery racks 2000 or sub-racks 2001 positioned at relatively long/short distances.

Referring back to FIG. 20, when the ESS 1 of the present embodiment includes two or more battery enclosures 1000, the control cabinet 4000 may be connected in parallel with the multiple battery enclosures 1000. In other words, each battery enclosure 1000 may be individually connected to the control cabinet 4000.

In the prior art structure, a control cabinet 4000 is connected in series with multiple battery enclosures 1000. In the prior art structure, the control cabinet 4000 is connected to one of the battery enclosures 1000, the battery enclosure 1000 connected to the control cabinet 4000 is then connected to an adjacent battery enclosure 1000, and this connected battery enclosure 1000 is connected again to another adjacent battery enclosure 1000. Thus, electrical connections are formed within the ESS 1.

However, since it is necessary to form the electrical connections between the battery enclosures 1000 after all the battery enclosures 1000 are fixed to the installation surface, there is a problem of increased installation time and complexity. In addition, the connections between the battery enclosures 1000 are primarily formed in upper regions near the ceiling, which makes it difficult for an operator to perform tasks in the upper regions of the battery enclosures 1000, resulting in increased fatigue and task difficulty. Moreover, in addition to what is illustrated, it is necessary for the battery enclosures 1000 to have, for example, separate communication or power connection structures, which may be typically provided in lower areas near the bottoms of the battery enclosures 1000. Therefore, in the prior art structure, there is the inconvenience of having to perform additional work on the ceiling areas of the battery enclosures 1000 in addition to the work on the bottom areas of the battery enclosures 1000.

In addition, since the battery enclosures 1000 are large and very heavy, once positioned, it is not easy to move the battery enclosures 1000. Therefore, connecting multiple battery enclosures 1000 on site requires not only precise process design and a high level of operator skill, but also significant time and cost. However, in reality, it is not easy to position the battery enclosures 1000 precisely in their predetermined positions, and as a result, the spacing between the installed battery enclosures 1000 may not be uniform. When the spacing between the battery enclosures 1000 is not uniform, it may be more difficult to form connections between the adjacent battery enclosures 1000.

Furthermore, in the prior art battery enclosures, the busbars 310 or conductive members connected to the busbars 310 could extend outside by penetrating through the enclosures. As a result, since an opening is formed at the top of each battery enclosure 1000, there is a problem in that it is difficult to completely seal the enclosure.

However, the ESS 1 of the present embodiment may resolve the aforementioned problem by forming the electrical connections between the control cabinet 4000 and the multiple battery enclosures 1000 in parallel, rather than in series. Each battery enclosure 1000 may be individually connected to the control cabinet 4000 via second cables 3200 extending from the control cabinet 4000, thereby simplifying the installation process of the energy storage system 1 and reducing installation time. The second cables 3200 will be described in more detail below. In addition, since each battery enclosure 1000 is connected in parallel to the control cabinet 4000, when an abnormal phenomenon occurs in one of the multiple battery enclosures 1000, the corresponding battery enclosure 1000 may be quickly disconnected or removed from the control cabinet 4000, which may make power management easier.

Furthermore, in the present embodiment, there may be no direct electrical connection formed between two adjacent battery enclosures 1000. As a result, while in the prior art, the busbars 310 or members connected thereto had to be exposed outside the enclosures 1001, in the present embodiment, the first cables 3100 may not be exposed outside. Through this, the sealing of the enclosures 1001 may be improved, and the management of the enclosures 1001 may be made easier.

The second cables 3200 may electrically connect the battery enclosures 1000 to an external electrical device, such as the control cabinet 4000. The second cables 3200 may extend outward from one side of the battery enclosures 1000 or may extend from an external device to one side of the battery enclosures 1000.

The second cables 3200 may each include a positive cable 3210 and a negative cable 3220. One end of each of the positive and negative cables 3210 and 3220 may be connected to the control cabinet 4000, and the other end may be connected to the control panel 3000 of the battery enclosure 1000, through which each battery enclosure 1000 may be connected in parallel to the control cabinet 4000. There may be multiple positive cables 3210 and negative cables 3220 included in the second cables 3200. Each of positive and negative cables 3210 and 3220 may be connected to a single battery enclosure 1000.

At least a portion of the second cables 3200 may be positioned at the bottom of the enclosure 1001. The second cables 3200 may extend downward from one side of the control cabinet 4000, then extend toward the battery enclosure 1000 under the installation surface, and extend upward again to access the control panel 3000 inside the battery enclosure 1000. The second cables 3200 may be routed into the bottom of the control panel 3000. For this purpose, an opening through which the second cables 3200 passes may be located at the bottom of the control panel 3000 or near the bottom. As illustrated in FIG. 17, the space through which the second cables 3200 extend to connect the control panel 3000 and the control cabinet 4000 may be referred to as a second power distribution space 1005. The second power distribution space 1005 may include at least a portion below the enclosure 1001. In this way, the second cables 3200 may be protected from external environments by extending below the installation surface. Considering the positions of the second cables 3200, the second cables 3200 may also be referred to as ground cables.

Figure 21:
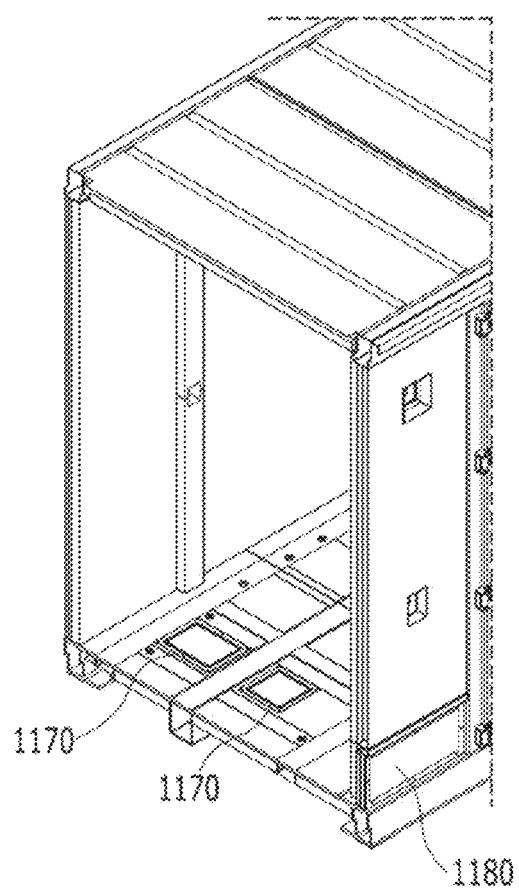
FIG. 21 is an enlarged view of one side of an enclosure included in the battery enclosure of FIG. 2.
Figure 22:
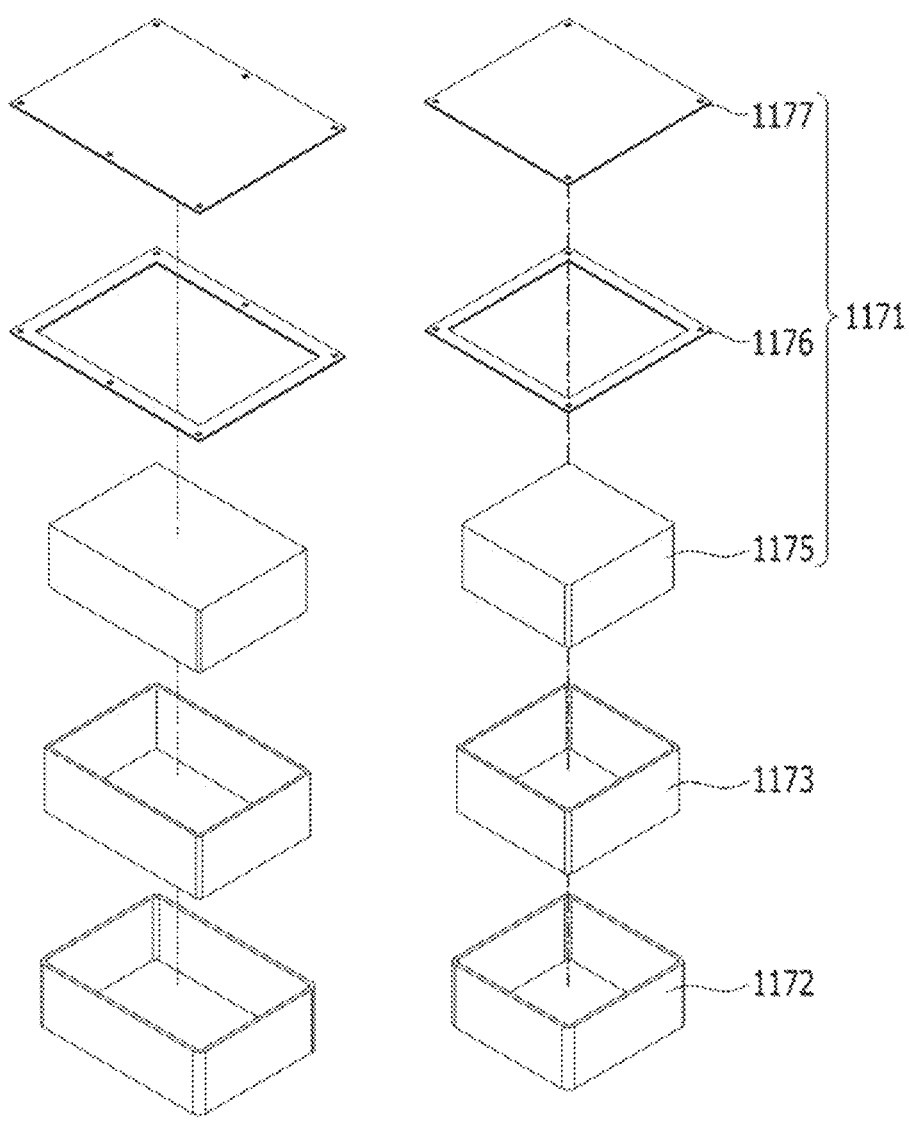
FIGS. 22 and 23 are exploded perspective views of closing units that close openings in the battery enclosure of FIG. 2.
Figure 23:
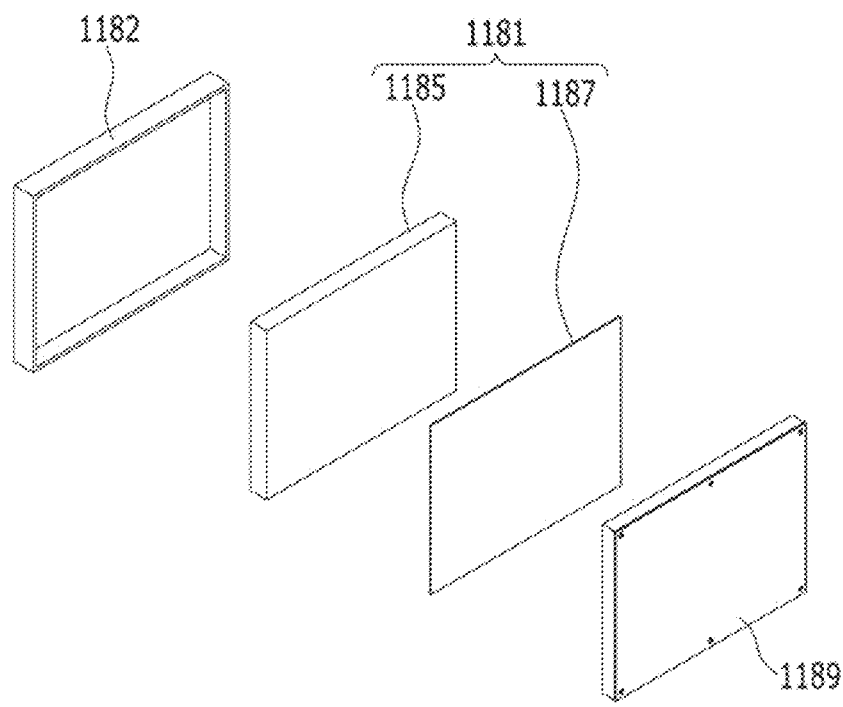
Figure 24:
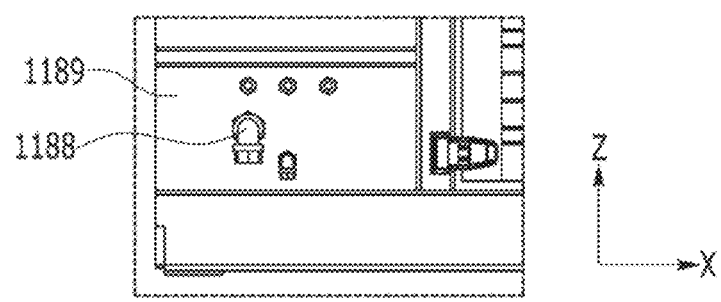
FIG. 24 illustrates a modification of the closing unit of FIG. 23.
Figure 25:
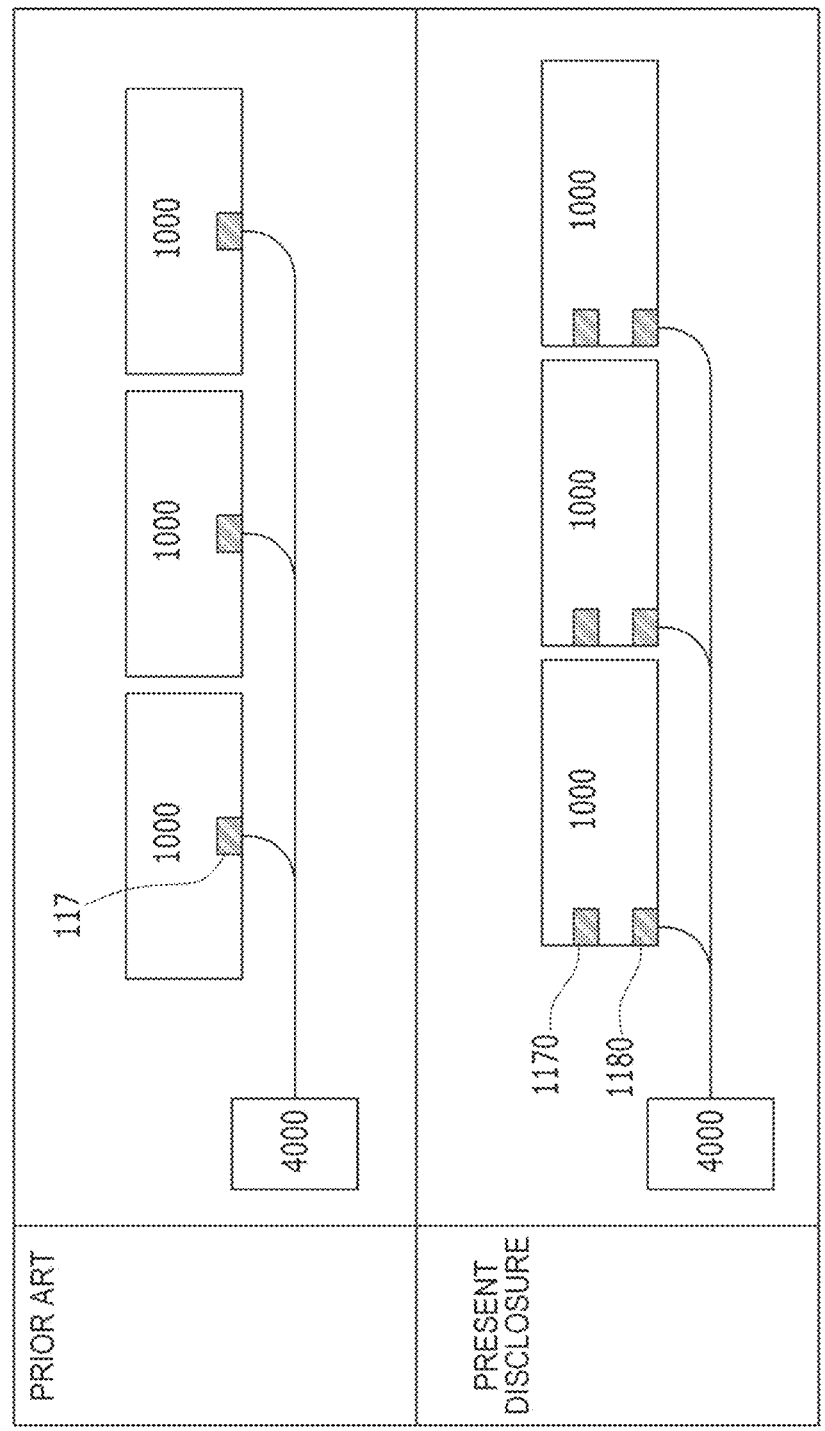
FIG. 25 is a view comparing connections between battery enclosures according to an embodiment of the present disclosure and the prior art.

FIG. 21 is an enlarged view of one side of an enclosure 1001 included in the battery enclosure 1000 of FIG. 2. FIG. 22 and FIG. 23 are exploded perspective views of closing units that close openings in the battery enclosure 1000 of FIG. 2. FIG. 24 illustrates a modification of the closing unit of FIG. 23. FIG. 25 is a view comparing connections between battery enclosures 1000 according to an embodiment of the present disclosure with the prior art.

Referring to FIGS. 21 to 25, the battery enclosure 1000 of the present embodiment may include openings 1170 and 1180 through which second cables 3200 pass.

The openings 1170 and 1180, which include a first opening 1170 and a second opening 1180, may allow the interior and the exterior of the battery enclosure 1000 to communicate with each other. The openings 1170 and 1180 may be provided for the second cables 3200 connecting the control panel 3000 and the control cabinet 4000. The openings 1170 and 1180 may be positioned close to the control panel 3000 to which the second cables 3200 are connected. The openings 1170 and 1180 may allow the control space 1003 and the second power distribution space 1005 to communicate with each other. The openings 1170 and 1180 may be positioned in the control space 1003 or the second power distribution space 1005. Alternatively, the openings 1170 and 1180 may be positioned between the control space 1003 and the second power distribution space 1005.

The first opening 1170 may be positioned on one surface of the enclosure 1001, and the second opening 1180 may be positioned on another surface of the enclosure 1001. The surface where the first opening 1170 is formed and the surface where the second opening 1180 is formed may be perpendicular to each other. The first opening 1170 may be positioned on a first surface of the control space 1003, and the second opening 1180 may be positioned on a second surface of the control space 1003, which is perpendicular to the first surface. For example, the first opening 1170 may be formed on the bottom surface of the enclosure 1001, i.e., on the base 1100. The second opening 1180 may be formed on a side surface of the enclosure 1001, i.e., on the front or rear surface. Here, there may be one or more first openings 1170 or second openings 1180. When the number of first openings or second openings is two or more, the flexibility in connecting the second cables 3200 to the control panel 3000 may be further improved. For example, the positive cables 3210 and negative cables 3220 of the second cables 3200 may be individually introduced into or drawn out through the two first openings 1170.

As illustrated in FIG. 25, prior art battery enclosures 1000 also include such openings 1170. However, in the prior art structure, a control panel 3000 of the battery enclosure 1000, or a similar configuration is positioned in the center, which limits the number and positions of openings. For example, in the prior art structure, the formation of the openings 1170 may be allowed only on the bottom surface of each enclosure 1001, and formation of a structure like the second opening 1180 positioned on the front or rear surface of the enclosure 1001 in the present embodiment may not be allowed.

In addition, in order to connect to a battery enclosure 1000, the second cables 3200 need to be bent, which may cause the second cables 3200 to have a curvature. However, when the locations and number of openings are limited, the curvature of the second cables 3200 may be formed to be large depending on the installation environments, which may cause malfunction of the battery enclosure 1001 or disconnection of the second cables 3200.

In the present embodiment, however, by positioning the control panel 3000 on one side of the battery enclosure 1000, the openings 1170 and 1180 may be respectively formed on different surfaces of the enclosure 1001. By forming multiple openings 1170 and 1180, an operator may select one of the first opening 1170 and the second opening 1180 and may dispose the second cables 3200 through the same during the installation of the battery enclosure 1000. As a result, compared to the prior art structure, the structure of the present embodiment may improve installation efficiency for an operator. In addition, depending on the position of the selected opening 1170 or 1180, the curvature of the second cables 3200 may vary, and accordingly, for example, disconnection of the second cables 3200 may be prevented.

Meanwhile, as multiple openings 1170 and 1180 are formed in the present embodiment, any unused opening 1170 or 1180 may be sealed after the installation of the battery enclosure 1000. Therefore, the battery enclosure 1000 of the present embodiment may include a first closing unit 1171 to seal the first opening 1170 and/or a second closing unit 1181 to seal the second opening 1180. The first closing unit 1171 and the second closing unit 1181 will be described in more detail below.

As illustrated in FIG. 22, boxes 1172 and 1173, which include first boxes 1172 and a second box 1173, may be positioned on the first openings 1170 of FIG. 21. The boxes 1172 and 1173 may protect the second cables 3200 that pass through the first openings 1170. The boxes 1172 and 1173 may have a rectangular pipe shape, and by positioning the boxes 1172 and 1173 such that individual surfaces thereof surround the second cables 3200, the second cables 3200 may be protected from external environments.

In the present embodiment, the boxes 1172 and 1173 include the first box 1172 and the second box 1173, but depending on the situation, only one of the first box 1172 and the second box 1173 may be provided.

The boxes 1172 and 1173 may not be included in the first closing unit 1171. In other words, the boxes 1172 and 1173 may be included in the base 1100 of the enclosure 1001 and may be provided in a state of being coupled to the edges of the first openings 1170. Therefore, even when the first openings 1170 are used and the second cables 3200 pass through the first openings 1170, the boxes 1172 and 1173 may be positioned on the first openings 1170.

The boxes 1172 and 1173 may each include four surfaces forming a rectangular pipe shape. In addition, depending on the design, the boxes 1172 and 1173 may have a structure with five closed surfaces, except for a surface corresponding to an opening. In such a case, during the installation of the battery enclosure 1000, a hole may be formed in the box 1172 or 1173 for the passage of the second cables 3200.

However, depending on the embodiment, the boxes 1172 and 1173 may not be included in the base 1100. The boxes 1172 and 1173 may be provided to ensure the stable sealing of the first openings 1170 and may be included in the first closing units 1171. In addition, depending on the embodiment, only the first boxes 1172 may be provided as basic features in the enclosure 1001, while the second box 1173 may be optionally provided. In this case, the second box 1173 may prevent any gap between the first box 1172 and the first closing unit 1171, and the second box 1173 may be included in the first closing units 1171.

The first closing unit 1171 for sealing the first opening 1170 may include an insulating material 1175, a sealing pad 1176, and a first cover 1177. In addition, as described above, the first closing unit 1171 may include one or both of the first box 1172 and the second box 1173.

The insulating material 1175 may seal the internal space of the boxes 1172 and 1173. The insulating material 1175 may prevent, for example, condensation that may occur due to the temperature difference between the interior and exterior of the enclosure 1001. The insulating material 1175 may be made of a material with low thermal conductivity.

The sealing pad 1176 may enhance the sealing level of the first opening 1170. The sealing pad 1176 may be positioned between one surface of the base 1100, where the first opening 1170 is formed, and the first cover 1177. The sealing pad 1176 may be provided to cover a predetermined edge area radially extending from the edges of the first opening 1170. The sealing pad 1176 may be configured to ensure that the edges of the first opening 1170 and the first cover 1177 are in close contact, thereby preventing a gap from being formed around the first closing unit 1171. For this purpose, the sealing pad 1176 may be made of an elastic material.

The first cover 1177 may close one side of the first opening 1170. The first cover 1177 may cover the first opening 1170 on one surface of the base 1100. The size of the first cover 1177 may be larger than the size of the first opening 1170.

The first closing unit 1171 may be coupled to the base 1100 via fastening members such as bolts. Specifically, after the first closing unit 1171 is positioned over the first opening 1170, bolts may be inserted into the edges of the first cover 1177, thereby allowing the first cover 1177 to be coupled to the base 1100.

The second closing unit 1181 for sealing the second opening 1180 may include an insulating material 1185 and a second cover 1187. Here, a detailed description of the insulating material 1185 and the second cover 1187 is omitted since the description of the insulating material 1175 and the first cover 1177 of the first closing unit 1171 is generally applicable.

As illustrated in FIG. 23, a third box 1182 may be provided in the second opening 1180. Since the description of the third box 1182 overlaps those of the above-mentioned boxes 1172 and 1173, a detailed description is omitted. As described above, the third box 1182 may be a component included in the base 1100 of the enclosure 1001 or a component included in the second closing unit 1181.

In FIG. 23, it is illustrated that the second closing unit 1181 does not include a component such as the sealing pad 1176 included in the first closing unit 1171. However, without being limited thereto, a structure similar to the sealing pad 1176 may also be provided in the second closing unit 1181.

The second opening 1180, which is positioned on the front or rear surface of the enclosure 1001, may be more completely sealed compared to the first opening 1170. For this purpose, a second external cover 1189 may be positioned on the outside of the second cover 1187. The second external cover 1189 may be made of the same or similar material as one surface of the enclosure 1001 to be integrated with the enclosure 1001. By providing the second external cover 1189 on the second opening 1180, the second opening 1180 may be sealed more stably. In addition, depending on the design, such an external cover may also be provided for the first opening 1170.

Even when the first opening 1170 or the second opening 1180 is used, areas other than the space where the second cables 3200 are located within the openings 1170 and 1180 may be sealed to ensure the sealing of the enclosure 1001. Therefore, even when the first opening 1170 or the second opening 1180 is in use, all or part of the components of the first closing unit 1171 and the second closing unit 1181 may be positioned within the first opening 1170 or the second opening 1180.

In this way, additional components, such as the second external cover 1189, may also be provided for the openings 1170 and 1180 that are in use, in addition to the closing units 1171 and 1181.

As illustrated in FIG. 24, when the second opening 1180 is used, the second external cover 1189 may include a conduit 1188 to guide the positioning of the second cables 3200. The conduit 1188 may guide the second cables 3200, positioned outside the enclosure 1001, downward. Through the conduit 1188, the second cables 3200 may be protected, and the second opening 1180 may be effectively sealed. In addition, even when the first opening 1170 is used, a first external cover may be provided, which may also include a conduit or a similar structure.

Hereinafter, the dimensions of the battery enclosure according to the present embodiment will be described.

In the prior art battery enclosure 1000, the enclosure 1001 may be mainly a typical 20-foot or 40-foot enclosure. However, there is a limit to adjusting the sizes of the battery racks 2000 and the control panel 3000 included in the battery enclosure 1000, and accordingly, even when the internal configuration is optimized, the ratio of dead space may be high. Therefore, the battery enclosure 1000 of the present embodiment may be provided with a separately designed enclosure 1001 in addition to a standardized enclosure.

For example, when a product is distributed in units of battery enclosures 1000, minimizing the volume and weight of the enclosure 1001 may be advantageous in terms of transportation. In addition, minimizing the volume and weight of the enclosure 1001 while maximizing the number of batteries 5000 installed therein to increase energy density may be advantageous in terms of power capacity.

Accordingly, in the present embodiment, the length LT, depth DT, and height HT of the enclosure 1001 have been reduced overall by minimizing dead space through the optimization of the internal space.

In order to achieve this, for example, first, in the present embodiment, the control panel 3000 is rotated 90 degrees. Accordingly, the size occupied by the control panel 3000 in the length direction of the enclosure 1001 (e.g., X-axis direction) may be minimized, and the length LT of the enclosure 1001 may be minimized.

Second, since the air conditioner 1300 is provided in a form coupled to the door 1200, the depth DT of the enclosure 1001 may be minimized.

Finally, the battery enclosure 1000 of the present embodiment adopts cables 3100 and 3200 instead of busbars 310 for electrical connections, by which insulating and fixing structures for the busbars 310 may be omitted, and the proportion of power distribution structure occupying the height HT of the enclosure 1001 may be minimized.

Hereinbelow, the dimensions of the enclosure 1001 are described. The dimensions of the enclosure 1001 described below may be based on the size of the batteries 5000. For convenience of explanation, the size of the batteries 5000 along the X-axis may be referred to as BLT, the size along the Y-axis as BDT, and the size along the Z-axis as BHT.

1) Length LT

The length LT of the enclosure 1001 may be expressed as follows:

$$LT = \text{(size occupied by power storage space 1002)} + \text{(size occupied by frame structure of enclosure 1001)} + \text{(size occupied by control space 1003)} \quad \text{Equation (1)}$$

In the present embodiment, the power storage space 1002 accommodates battery racks 2000, which may include batteries 5000 arranged in a column within each sub-rack 2001. Therefore, the size occupied by the power storage space 1002 in the length direction (e.g., X-axis direction) may be described as follows:

$$\text{The size occupied by the power storage space 1002} = BLT \times \text{(number of columns included in all battery racks 2000)} \times A1 \quad \text{Equation (1-1)}$$

Here, the number of columns included in the battery racks 2000 may refer to the total number of batteries 5000 that are capable of being disposed in the length direction of the enclosure 1001. In an embodiment, the number of columns included in the battery racks 2000 may be 10 or more. For example, the number of columns included in the battery racks 2000 may range from 10 to 12.

Here, the spacing compensation value A1 may be a weight that considers the thickness of, for example, the columns 2100 and 2200 of the battery racks 2000 and the spacing between the battery racks 2000, in addition to the length BLT of the batteries 5000. The spacing and frame thickness may be proportional to the total number of columns formed in all the battery racks 2000. Therefore, in Equation (1-1), by applying the spacing compensation value A1, which is the weight, to the length of the batteries 5000 and the total number of columns included in all the battery racks 2000, the size occupied by the power storage space 1002 in the length direction (the X-axis direction) may be calculated.

The spacing compensation value A1 may be selected from a range of 1.1 to 1.5. For example, when the length BLT of the battery 5000 is 400 cm and the total number of columns is 11, the size occupied by the power storage space 1002 in the length direction (the X-axis direction) may range from 400 cm×11×1.1 to 400 cm×11×1.5.

In addition to the power storage space 1002 including the battery racks 2000 and the control space 1003 including the control panel 3000, the enclosure 1001 may also include external structures such as the main columns 1190. Therefore, when calculating the length LT of the enclosure 1001, a value for the frame structure may need to be considered.

$$\text{The size occupied by the frame structure of the enclosure 1001} = BLT \times B1 \quad \text{Equation (1-2)}$$

Here, the external structure compensation value B1 may be a weight considering the frame structure such as the main columns 1190 and other columns. The size occupied by the external structure in the length direction (the X-axis direction) may be expressed based on BLT, and may be calculated by multiplying BLT by B1.

The external structure compensation value B1 may be selected from 0.6 to 1.4. For example, when the length BLT of the batteries 5000 is 400 cm, the size occupied by the external structure in the length direction (e.g., X-axis direction) may be 400 cm×0.6 to 400 cm×1.4.

The size occupied by the control space 1003 in the length direction (the X-axis direction) may be expressed based on the length BLT of the batteries 5000 as follows. At this time, the control space 1003 may include the control panel 3000 and other spaces.

$$\text{The size occupied by the control space 1003} = BLT \times E1 \quad \text{Equation (1-3)}$$

Here, the spacing compensation value E1 represents the size of the control space 1003, where the control panel 3000 and other electrical components are positioned, based on the length BLT of the batteries 5000. E1 may be selected from a range of 1.2 to 2.0. In this case, compared to the typical size of the control panel 3000, the smaller value of E1 may be applied to Equation (1-3) because the control panel 3000 in the present embodiment is positioned to face either the left or right side of the enclosure 1001.

Therefore, the length in the present embodiment may be expressed as follows:

$$LT = BLT \times \text{(number of columns included in all battery racks)} \times A1 + B1 + E1 \qquad \text{Equation (1-4)}$$

2) Height (HT)

Meanwhile, the height HT of the enclosure 1001 may be expressed as follows:

$$HT = \text{(size occupied by battery racks 2000 in height direction)} + \text{(size occupied by frame structure of enclosure 1001)} + \text{(size of first power distribution space 1004 required for arranging first cables 3100)} \qquad \text{Equation (2)}$$

Here, the height of the battery racks 2000 may be proportional to the number of batteries 5000 capable of being stacked within the battery racks 2000. In addition, each battery rack 2000 includes a control unit 5100, which may need to be additionally considered.

Therefore, the size occupied by the battery racks 2000 in the height direction (the Z-axis direction) may be represented as follows:

$$\text{The size occupied by the battery racks 2000 in the height direction} = \{BHT \times \text{(maximum number of batteries 5000 capable of being mounted in one column)} + 1\} \times A2 \qquad \text{Equation (2-1)}$$

The maximum number of batteries 5000 capable of being mounted in one column may refer to the total number of batteries 5000 capable of being arranged in the height direction of the enclosure 1001. Considering the control unit 5100, 1 is added to the maximum number of batteries 5000 capable of being mounted in the battery rack 2000. The maximum number of batteries 5000 capable of being stacked in one column of the battery rack 2000 may be 16 or more. For example, the maximum number of batteries 5000 capable of being stacked in one column of the battery rack 2000 may range from 16 to 18.

The spacing compensation value A2 may be a weight that considers the structure of the battery racks 2000 and the spacing between the batteries 5000, in addition to the height BHT of the batteries 5000. The spacing compensation value A2 may be selected from a range of 1.0 to 1.3.

In addition, the value for the frame structure, such as the base 1100 of the enclosure 1001, may be represented based on the height BHT of the batteries 5000, as follows:

$$\text{The size occupied by the frame structure of the enclosure 1001} = BHT \times B2 \qquad \text{Equation (2-2)}$$

Here, B2 may range from 2 to 4.

In addition, the size of the first power distribution space 1004 may be expressed based on the height BHT of the battery 5000 as follows:

$$\text{The size of the first power distribution space 1004} = BHT \times E2 \qquad \text{Equation (2-3)}$$

Here, the spacing compensation value E2 may represent the size of the first power distribution space 1004 based on the height BHT of the battery 5000.

E2 may be selected from a range of 1 to 3.

Accordingly, the height HT of the enclosure 1001 may be expressed as follows:

$$HT = \{BHT \times \text{(maximum number of batteries 5000 capable of being mounted in one column)} + 1\} \times A2 + (B2) + (E2) \qquad \text{Equation (2-4)}$$

3) Depth DT

The depth DT of the enclosure 1001 may be expressed as follows:

$$DT = \text{(size occupied by battery racks 2000 in depth direction)} + \text{(frame structure including, e.g., air conditioner 1300)} \qquad \text{Equation (3)}$$

Here, the size occupied by the battery racks 2000 in the depth direction (the Y-axis direction) may be represented as follows:

$$\text{The size occupied by the battery racks 2000 in the depth direction} = BDT \times \text{(number of rows in the battery rack 2000)} \times (A3) \qquad \text{Equation (3-1)}$$

Here, the number of rows in the battery rack 2000 may refer to the total number of batteries 5000 capable of being arranged in the depth direction of the enclosure 1001. The number of rows in the battery rack 2000 may be 1 or 2, for example, 1.

Here, the spacing compensation value A3 may be a weight that considers, in addition to the depth BDT of the batteries 5000, the thickness of, for example, the columns 2100 and 2200 of the battery racks 2000, and, for example, the spacing between the battery racks 2000 and the enclosure 1001. The spacing compensation value A3 may range from 1.0 to 1.1.

In addition, the size occupied by the frame structure including, for example, the air conditioner 1300, may be expressed as follows:

$$\text{The size occupied by the frame structure including, for example, the air conditioner 1300} = BDT \times B3 \qquad \text{Equation (3-2)}$$

Here, B3 represents the size of the structure, other than the batteries 5000, in the depth direction (the Y-axis direction), expressed based on the depth BDT of the batteries 5000. B3 may range from 0.2 to 0.8.

Accordingly, the height HT of the enclosure 1001 may be expressed as follows:

$$DT = (BDT) \times$$
$$\text{(number of rows in the battery rack } 2000) \times A3 + B3]$$

Equation (3-3)

The dimensions of 20-foot or 40-foot enclosures typically used in an energy storage system 1 are as follows:
- 20-foot enclosure: 6,096 mm (20 ft)×2,438 mm (8 ft)×2,590 mm (8 ft 6 in) 40-foot enclosure: 12,192 mm (40 ft)×2,438 mm (8 ft)×2,590 mm (8 ft 6 in)
- 20-foot HC enclosure: 6,096 mm (20 ft)×2,438 mm (8 ft)×2,895 mm (9 ft 6 in)
- 40-foot HC enclosure: 12,192 mm (20 ft)×2,438 mm (8 ft)×2,895 mm (9 ft 6 in)

Hereinafter, these four dimensions will be referred to as "standard enclosure dimensions." In addition, the aforementioned four dimensions may be referred to as "20-foot standard enclosure" or "40-foot standard enclosure" depending on the length. Therefore, "20-foot standard enclosure" or "40-foot standard enclosure" may be interpreted to include both general and HC specifications.

The dimensions of the enclosure 1001 in the present embodiment may have the following values:

$$6{,}096 \text{ mm} \leq LT \leq 8{,}696 \text{ mm}$$
$$1{,}638 \text{ mm} \leq DT \leq 2{,}438 \text{ mm}$$
$$2{,}390 \text{ mm} \leq HT \leq 3{,}490 \text{ mm}$$

As the length LT increases, more batteries 5000 may be loaded into the enclosure 1001. Therefore, when the length LT of the enclosure 1001 is less than 6,096 mm, the power capacity of the battery enclosure 1000 may be insufficient. In addition, when the length LT of the enclosure 1001 exceeds 8,696 mm, a large number of batteries 5000 may be loaded, but the volume and weight of the enclosure 1001 may increase excessively, leading to higher transportation costs.

As the depth DT decreases, the volume of the enclosure 1001 may decrease. This may be because more space is eliminated when the depth DT decreases compared to when the length LT or height HT decreases. Therefore, in the enclosure 1001 used for the battery enclosure 1000, a relatively smaller value for the depth DT may be selected. Accordingly, the depth of the enclosure 1001 in the present embodiment may have a depth equal to or smaller than the depth values of standard enclosure dimensions, but when the depth DT is less than 1,638 mm, it may be difficult to load the batteries 5000. Therefore, the depth DT may range from 1,638 mm to 2,438 mm.

As the height (HT) increases, more batteries 5000 may be vertically stacked, and as sufficient upper space is formed, it may be easy to form electrical connections inside the battery enclosure 1000. Therefore, when the height HT of the enclosure 1001 is less than 2,390 mm, it may be difficult to establish electrical connections inside the battery enclosure 1000, or the number of stacked batteries 5000 may be limited.

When the height HT is excessively large, however, the overall volume of the enclosure 1001 may increase, which may result in increased transportation costs. Furthermore, when the height HT is excessively large, it may be difficult to vertically stack the battery enclosures 1000 during transportation, which may also result in increased transportation costs. Considering these points, the height HT of the enclosure 1001 may be designed similarly to standard enclosure dimensions, and when the height HT exceeds 3,490 mm, transportation costs may increase excessively as described above.

Comparing the enclosure 1001 of the present embodiment to 20-foot or 40-foot standard enclosure dimensions, the depth DT of the enclosure 1001 may be equal to or smaller than that of a standard enclosure.

In the enclosure 1001, the front and rear surfaces may have larger areas compared to other surfaces of the enclosure 1001, and thus, when the depth DT is reduced, the volume of the enclosure 1001 may be effectively reduced. As such, by reducing the depth DT in the present embodiment, the enclosure 1001 may have a volume equal to or smaller than that of a 20-foot or 40-foot standard enclosure.

The length LT of the enclosure 1001 in the present embodiment may be equal to or greater than that of a 20-foot enclosure, and smaller than that of a 40-foot enclosure. Since the depth DT of the enclosure 1001 in the present embodiment is reduced compared to prior art enclosures, even when the length LT is increased, the enclosure 1001 may still have a volume equal to or smaller than that of a 20-foot enclosure. Therefore, compared to prior art enclosures with the same volume, a larger number of batteries 5000 may be loaded in the enclosure 1001 in the present embodiment.

In this way, the battery enclosure 1000 of the present embodiment includes an enclosure 1001 with optimized dimensions, thereby enabling a larger number of batteries 5000 to be loaded within the same space and achieving a reduction in transportation costs.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. A battery enclosure comprising:
    an enclosure including a base fixed to an installation surface; and
    a battery rack being fixed to the base and configured to accommodate at least one battery,
    wherein the battery rack includes at least one column extending a vertical direction,
    wherein the base includes at least one horizontal beam and at least one vertical beam,
    wherein the horizontal beam includes a fixture configured to fix the battery enclosure to the installation surface,
    wherein the fixture is provided at a position corresponding to a position of the column included in the battery rack,
    wherein the fixture includes a middle fixture provided on the horizontal beam and a corner fixture positioned adjacent to an end of the horizontal beam or an end of the vertical beam, wherein the battery enclosure further comprises a coupler that is positioned adjacent to the corner fixture, the corner fixture having a surface with a hole in a vertical direction, and wherein the surface having the hole in the vertical direction is aligned in a depth direction of the battery enclosure.

2. The battery enclosure of claim 1, wherein a single fixture is provided on the horizontal beam.

3. The battery enclosure of claim 1, wherein the fixture provided on the horizontal beam is positioned apart from a center of the horizontal beam in a length direction.

4. The battery enclosure of claim 1, wherein multiple corner fixtures are provided, and wherein the middle fixture is positioned between two corner fixtures.

5. The battery enclosure of claim 4, wherein the middle fixture is positioned closer to one of the two corner fixtures than to another one.

6. The battery enclosure of claim 1, wherein the battery rack includes multiple columns in which batteries are vertically stacked.

7. The battery enclosure of claim 1, wherein the middle fixture includes a bottom surface in which a hole is formed, and a support surface extending from an edge of the bottom surface to the horizontal beam.

8. The battery enclosure of claim 1, wherein the corner fixture includes a bottom surface in which a hole is formed, and an edge of the bottom surface is positioned adjacent to the horizontal beam or the vertical beam.

9. The battery enclosure of claim 1, wherein the base includes a rack fixing beam positioned between two horizontal beams, and the column is fixed to the rack fixing beam.

10. The battery enclosure of claim 9, wherein a sub-vertical beam is positioned below the rack fixing beam, and wherein the sub-vertical beam is disposed perpendicular to the horizontal beam.

11. The battery enclosure of claim 1, wherein the horizontal beam includes a partition formed therein.

12. The battery enclosure of claim 11, wherein the base further includes a sub-vertical beam disposed perpendicular to the horizontal beam, and wherein both ends of the sub-vertical beam are in contact with the partition of the horizontal beam.

13. The battery enclosure of claim 1, wherein the battery enclosure further includes a control panel configured to manage the battery rack, and wherein the front surface of the control panel is disposed perpendicular to the front surface of the battery rack.

14. The battery enclosure of claim 1, further comprising:

an air conditioner configured to dissipate heat from the at least one battery, wherein the air conditioner is provided in a state coupled to a door installed on the front surface of the battery rack to allow access to the battery rack.

15. The battery enclosure of claim 1, wherein a cable is installed in the battery enclosure as a conductive member for electrical connection.

16. An energy storage system comprising the battery enclosure of claim 1.

17. The battery enclosure of claim 1, wherein the middle fixture includes a bottom surface having a hole and a support surface extending between the bottom surface and the horizontal beam, and the support surface has a triangular shape extending perpendicularly from an edge of the bottom surface and connected to the horizontal beam.

18. The battery enclosure of claim 17, wherein one edge of the surface of the corner fixture is adjacent to the coupler, and wherein another edge of the surface of the corner fixture, perpendicular to the one edge, is adjacent to the vertical beam.

19. The battery enclosure of claim 17, wherein the corner fixture is coupled to the vertical beam or the coupler.

20. The battery enclosure of claim 1, the corner fixture is provided as at least a pair separated in the depth direction, and wherein surfaces having the holes of the pair of corner fixtures face each other in the depth direction.

* * * * *